United States Patent
Takagi et al.

(10) Patent No.: US 9,423,623 B2
(45) Date of Patent: Aug. 23, 2016

(54) GRADIENT INDEX LIQUID CRYSTAL OPTICAL DEVICE AND IMAGE DISPLAY DEVICE

(71) Applicant: KABUSHIKI KAISHA TOSHIBA, Tokyo (JP)

(72) Inventors: Ayako Takagi, Yokosuka (JP); Shinichi Uehara, Tokyo (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 13/905,694

(22) Filed: May 30, 2013

(65) Prior Publication Data
US 2013/0258219 A1 Oct. 3, 2013

Related U.S. Application Data

(63) Continuation of application No. PCT/JP2010/071352, filed on Nov. 30, 2010.

(51) Int. Cl.
*G02F 1/1343* (2006.01)
*G02B 27/22* (2006.01)
*G02F 1/29* (2006.01)

(52) U.S. Cl.
CPC ...... *G02B 27/2214* (2013.01); *G02F 1/134363* (2013.01); *G02F 1/29* (2013.01); *G02F 2001/134381* (2013.01); *G02F 2001/294* (2013.01)

(58) Field of Classification Search
CPC .............. G02F 2001/134381; G02F 1/134363
See application file for complete search history.

(56) References Cited

U.S. PATENT DOCUMENTS

| 6,104,368 A | 8/2000 | Bonnett et al. |
| 7,532,293 B2 * | 5/2009 | Choi ................ G02F 1/134363 349/141 |
| 2004/0222945 A1 | 11/2004 | Taira et al. |

(Continued)

FOREIGN PATENT DOCUMENTS

| CN | 1920615 A | 2/2007 |
| CN | 101458412 A | 6/2009 |

(Continued)

OTHER PUBLICATIONS

Taiwanese Office Action of Taiwan Patent Application No. of 100133953 dated Jan. 14, 2014 and English translation thereof (18 pages).

(Continued)

*Primary Examiner* — Paisley L Arendt
(74) *Attorney, Agent, or Firm* — Finnegan, Henderson, Farabow, Garrett & Dunner, LLP

(57) ABSTRACT

According to one embodiment, a device includes first and second substrate units, a liquid crystal layer. The first substrate unit includes a first substrate, first and second electrodes, an extraction electrode, and a dielectric material layer. The second substrate unit includes a second substrate and a third electrode. The liquid crystal layer is provided between the first and second substrates. The first electrodes are provided on the first substrate to extend in a first direction. The second electrodes are provided on the first substrate and extend along the first direction. The extraction electrode is for electrically connecting the second electrodes. The third electrode is provided on the second substrate to extend in a second direction intersecting the first direction.

11 Claims, 21 Drawing Sheets

(56) References Cited

U.S. PATENT DOCUMENTS

2006/0268211 A1 11/2006 Chen
2007/0046564 A1 3/2007 Kim et al.
2010/0073347 A1 3/2010 Takagi et al.
2010/0182291 A1 7/2010 Kim et al.
2010/0238276 A1 9/2010 Takagi et al.

FOREIGN PATENT DOCUMENTS

| | | |
|---|---|---|
| JP | 05-188343 | 7/1993 |
| JP | 10-325945 | 12/1998 |
| JP | 2000-102038 | 4/2000 |
| JP | 2004-258631 | 9/2004 |
| JP | 2010-78653 | 4/2010 |
| JP | 2010-224191 A | 10/2010 |
| TW | 200528796 | 9/2005 |
| TW | 200641441 | 12/2006 |
| TW | 200801677 | 1/2008 |
| TW | 200925652 | 6/2009 |
| TW | 201019018 | 5/2010 |

OTHER PUBLICATIONS

Notification of the First Office Action issued by the National Intellectual Property Agency of China on Oct. 31, 2014, for Chinese Patent Application No. 201080069116.0, and English-language translation thereof.

English-language International Search Report from the Japanese Patent Office for International Application No. PCT/JP2010/071352, mailing date Mar. 8, 2011.

Notification of the Second Office Action of Chinese Patent Application No. 201080069116.0 ,dated May 25, 2015 and the translation thereof (17 pages).

Yoshino et al.; "Fundamental of Liquid Crystal and Display", Corona Publishing Co., Ltd., pp. 66-71 and pp. 100-101, (1994).

European Examination Report of European Application No. 10 860 367.1, dated Jun. 26, 2015 (6 pages).

First Office Action in Japanese Patent Application No. 2014-065923, dated Feb. 24, 2015 (4 pages).

\* cited by examiner

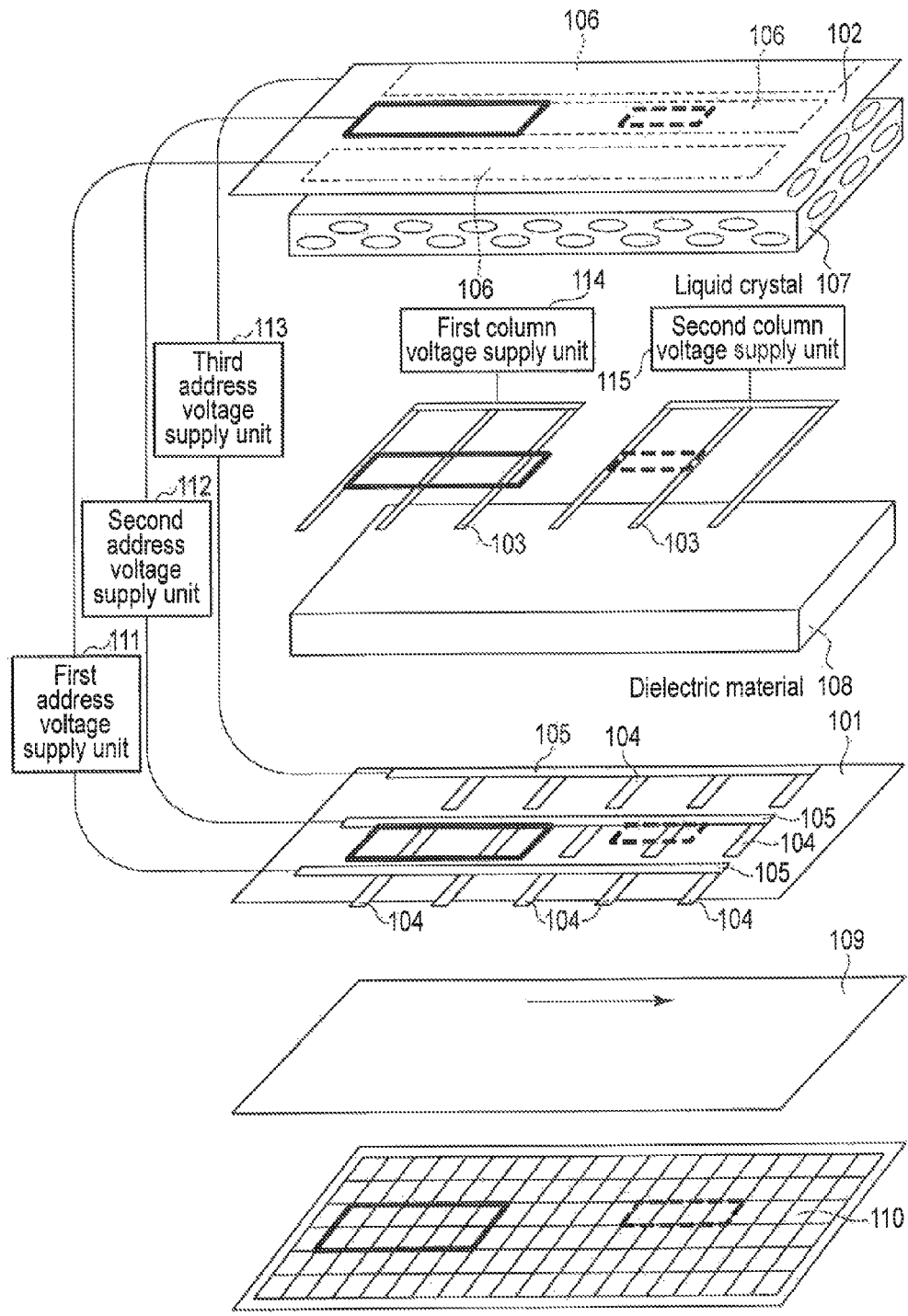
F I G. 1

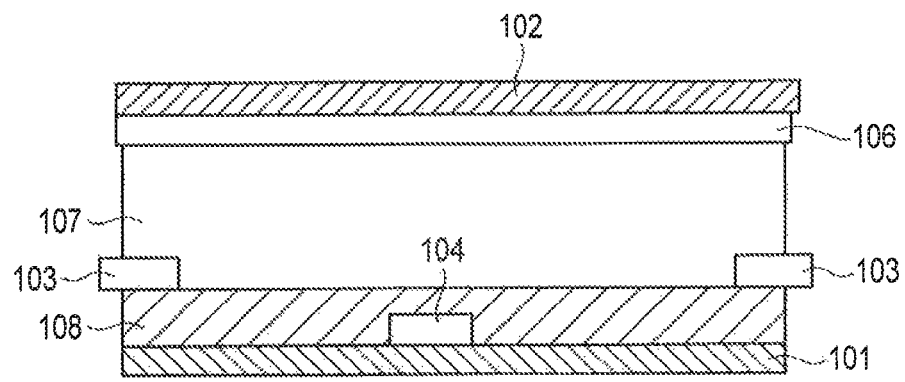
F I G. 3
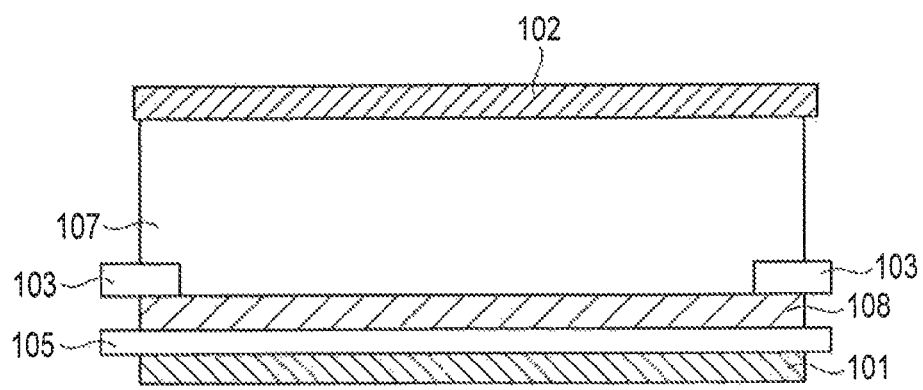
F I G. 4

| Address | Column | 3D |
|---|---|---|
| 0 | 0 | OFF |
| 0 | 1 | OFF |
| 1 | 0 | OFF |
| 1 | 1 | ON |

| W1(address) | W1(column) | W2(address) | W2(column) | Voltage waveforms | | Averaged voltage (V) Pulse driving | Display mode |
|---|---|---|---|---|---|---|---|
| | | | | Voltage (V) applied to liquid crystal in first half | Voltage (V) applied to liquid crystal in second half | | |
| ON(1) | ON(-1) | ON(1) | ON(-1) | Va+Vd | Va+Vd | | |
| ON(1) | ON(-1) | ON(1) | OFF(1) | Va+Vd | Va+Vd | | |
| ON(1) | ON(-1) | OFF(0) | ON(-1) | Va+Vd | Vd | $\sqrt{((Va+Vd)^2/2+Vd^2/2)}$ | 3D |
| ON(1) | ON(-1) | OFF(0) | OFF(1) | Va+Vd | Vd | $\sqrt{((Va+Vd)^2/2+Vd^2/2)}$ | 3D |
| ON(1) | OFF(1) | ON(1) | ON(-1) | | | | |
| ON(1) | OFF(1) | ON(1) | OFF(1) | | | | |
| ON(1) | OFF(1) | OFF(0) | ON(-1) | Vd | Vd | Vd | 2D |
| ON(1) | OFF(1) | OFF(0) | OFF(1) | Vd | Vd | | |
| OFF(0) | ON(-1) | ON(1) | ON(-1) | Vd | Va+Vd | $\sqrt{((Va+Vd)^2/2+Vd^2/2)}$ | 3D |
| OFF(0) | ON(-1) | ON(1) | OFF(1) | Vd | Vd | | |
| OFF(0) | ON(-1) | OFF(0) | ON(-1) | Vd | Vd | | |
| OFF(0) | ON(-1) | OFF(0) | OFF(1) | Vd | Vd | | |
| OFF(0) | OFF(1) | ON(1) | ON(-1) | Vd | Va+Vd | $\sqrt{((Va+Vd)^2/2+Vd^2/2)}$ | 3D |
| OFF(0) | OFF(1) | ON(1) | OFF(1) | Vd | Vd | Vd | 2D |
| OFF(0) | OFF(1) | OFF(0) | ON(-1) | Vd | Vd | Vd | 2D |
| OFF(0) | OFF(1) | OFF(0) | OFF(1) | Vd | Vd | Vd | 2D |

FIG. 14

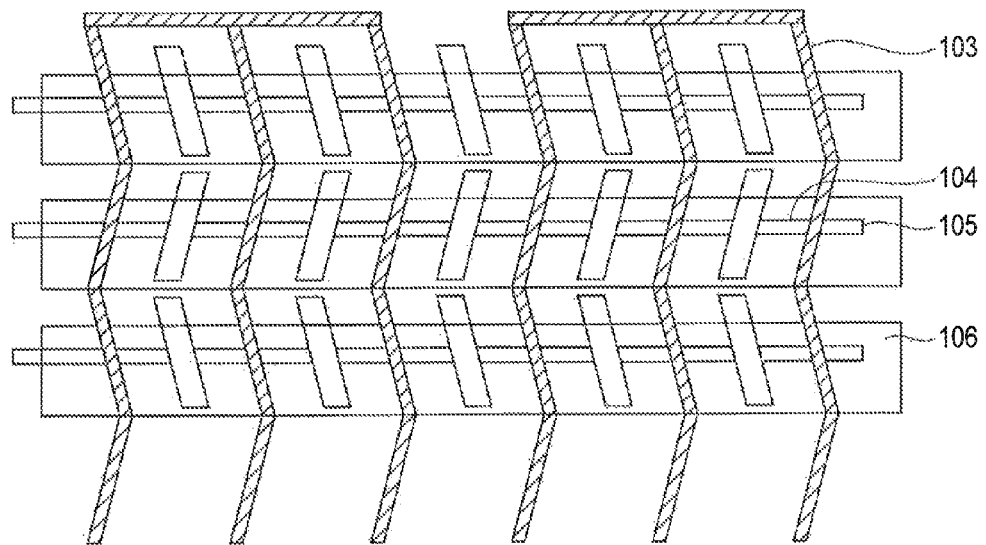
F I G. 26
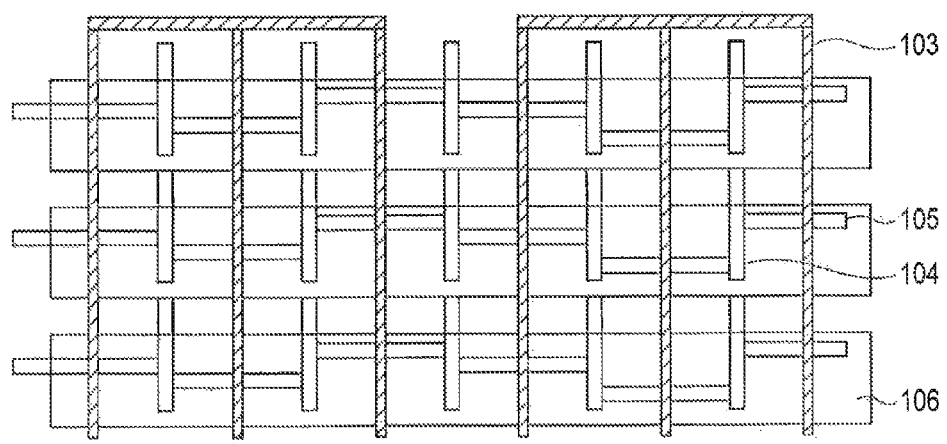
F I G. 27

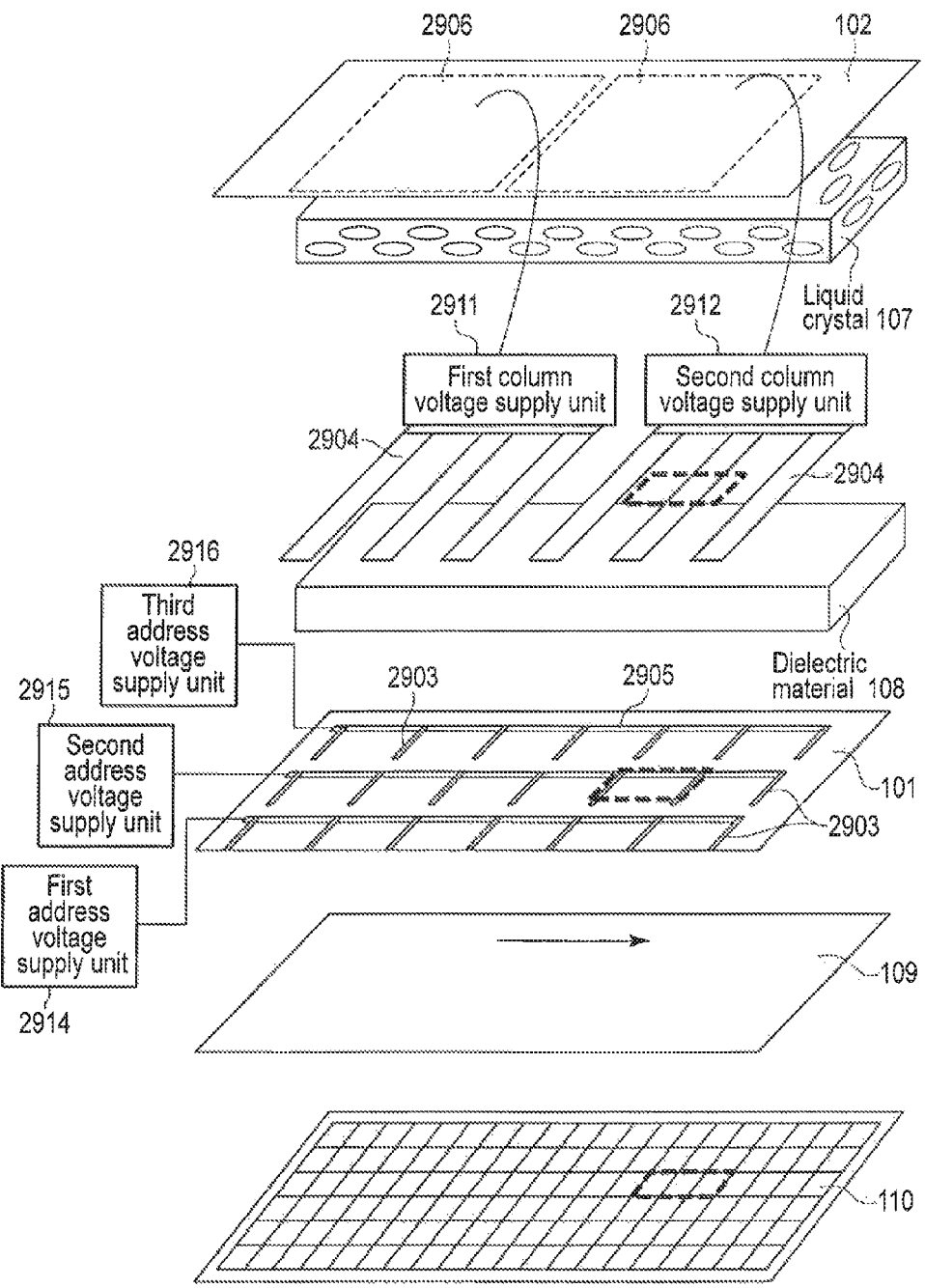
F I G. 29

GRADIENT INDEX LIQUID CRYSTAL OPTICAL DEVICE AND IMAGE DISPLAY DEVICE

CROSS REFERENCE TO RELATED APPLICATIONS

This application is a Continuation application of PCT Application No. PCT/JP2010/071352, filed Nov. 30, 2010, the entire contents of which are incorporated herein by reference.

FIELD

Embodiments described herein relate generally to a gradient index liquid crystal optical device and image display device.

BACKGROUND

Conventionally, a display device capable of displaying a stereoscopic (three-dimensional) image has been proposed. Also, a demand has arisen for a display device capable of selectively displaying a two-dimensional (2D) image and three-dimensional (3D) image, and techniques meeting this demand have been proposed.

For example, JP-A 2000-102038 (KOKAI) describes a technique of switching 2D display and 3D display by using a liquid crystal lens array element. This liquid crystal lens array element includes rod-like electrodes periodically arranged on one substrate, and produces an electric field distribution with respect to an electrode formed on an opposing substrate. This electric field distribution changes the orientation of a liquid crystal layer, and generates a refractive index profile acting as a lens. Since the lens action can be turned on and off by controlling voltages to be applied to the electrodes, 2D display and 3D display can be switched. A system of controlling the orientation direction of liquid crystal molecules by an electric field as described above is called a liquid crystal gradient index (GRIN) lens system. In this arrangement, a 3D display voltage or 2D display voltage is applied to each rod-like electrode. This makes it possible to partially switch 2D display and 3D display in a direction in which the rod-like electrodes are arranged.

In addition, JP-A 2004-258631 (KOKAI) describes an arrangement including a variable polarization cell in addition to a liquid crystal lens array element. In this arrangement, it is possible to partially switch 2D display and 3D display by switching, in the display plane, the polarized states of light entering the liquid crystal lens array element.

Also, JP-A 2004-258631 (KOKAI) has proposed a flag-bit driving method as a driving method of controlling the above-described variable polarization cell. This facilitates driving for implementing the partial display of 2D display and 3D display by grouping a plurality of electrodes of the variable polarization cell.

In the 2D/3D display switching display described in JP-A 2000-102038 (KOKAI), however, the rod-like electrodes are arranged in only the horizontal direction. Consequently, 2D display and 3D display can be switched on the full screen. Also, 2D display and 3D display can partially be switched in the horizontal direction. However, the screen cannot be split in the vertical direction.

In addition, in the display described in JP-A 2004-258631 (KOKAI) or JP-A 2010-78653 (KOKAI), the screen can be split not only in the horizontal direction but also in the vertical direction. However, the variable polarization cell is necessary in addition to the liquid crystal GRIN lens element. This increases the thickness and weight, and raises the cost.

BRIEF DESCRIPTION OF THE DRAWINGS

FIG. 1 is a perspective exploded view showing a stereoscopic image display device of the first embodiment;

FIG. 3 is a sectional view taken along line A-A' in FIG. 2;

FIG. 4 is a sectional view taken along line B-B' in FIG. 2;

FIG. 14 is a table showing the relationship between voltages to be applied to the address portion and column portion, voltages to be actually applied to a liquid crystal, and a display mode;

FIG. 26 is a plan perspective view showing a liquid crystal lens array element of the sixth embodiment;

FIG. 27 is a plan perspective view showing a liquid crystal lens array element of the seventh embodiment;

FIG. 29 is a perspective exploded view showing a stereoscopic image display device of the ninth embodiment;

DETAILED DESCRIPTION

Figure 2:
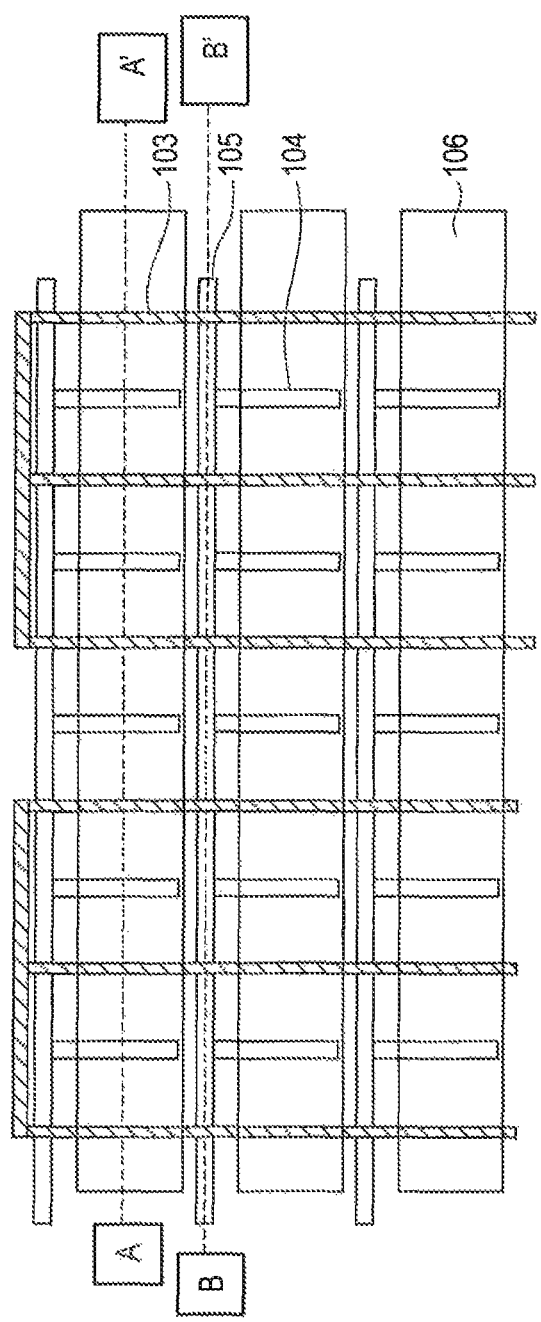
FIG. 2 is a plan perspective view showing the stereoscopic image display device of the first embodiment.

A gradient index liquid crystal optical device and image display device according to this embodiment, particularly, a liquid crystal lens array element and stereoscopic image display device will be explained in detail below with reference to the accompanying drawings. Note that in the following embodiments, parts denoted by the same reference numeral perform the same operation, and a repetitive explanation will be omitted.

In general, according to one embodiment, a gradient index liquid crystal optical device includes a first substrate unit, a second substrate unit, and a liquid crystal layer. The first substrate unit includes a first substrate, a plurality of first electrodes, a plurality of second electrodes, an extraction electrode, and a dielectric material layer. The second substrate unit includes a second substrate and a third electrode. The liquid crystal layer is provided between the first substrate and the second substrate. The first electrodes are provided on the first substrate to extend in a first direction. The second electrodes are provided on the first substrate and extend along the first direction. Each of the second electrodes is arranged between the first electrodes when each of the second electrodes is projected onto a plane parallel to the first substrate. Each of the second electrodes is arranged along a second direction intersecting the first direction. The extraction electrode for electrically connecting the second electrodes is provided on the first substrate. The dielectric material layer is for electrically insulating the first electrodes and the second electrodes. The third electrode is provided on the second substrate to extend in the second direction.

It is an object of this embodiment to provide a gradient index liquid crystal optical device and image display device capable of partially displaying an image by using only a lens.

Also, an image display device according to this embodiment includes the above-mentioned gradient index liquid crystal optical device, and an image display unit.

First Embodiment

A liquid crystal lens array element and stereoscopic image display device of this embodiment will be explained below with reference to FIGS. 1, 2, 3, and 4. Note that a portion indicated by the thick black dotted lines in FIG. 1 indicates one lens unit. FIG. 2 is a plan perspective view taken in a direction perpendicular to a substrate. FIG. 3 is a sectional view taken along line A-A' in FIG. 2. FIG. 4 is a sectional view taken along line B-B' in FIG. 2.

The stereoscopic image display device of this embodiment includes a first substrate 101, a second substrate 102, first electrodes 103, second electrodes 104, second extraction electrodes 105, third electrodes 106, a liquid crystal 107, a dielectric material 108, a polarizing plate 109, a two-dimensional image display device 110, a first address voltage supply unit 111, a second address voltage supply unit 112, a third address voltage supply unit 113, a first column voltage supply unit 114, and a second column voltage supply unit 115. The liquid crystal lens array element corresponds to a portion obtained by excluding the polarizing plate 109 and two-dimensional image display device 110 from the stereoscopic image display device, and includes the first substrate 101, second substrate 102, first electrodes 103, second electrodes 104, second extraction electrodes 105, third electrodes 106, liquid crystal 107, and dielectric material 108. The liquid crystal lens array element can also include the first address voltage supply unit 111, second address voltage supply unit 112, third address voltage supply unit 113, first column voltage supply unit 114, and second column voltage supply unit 115.

Note that "above" or "on" expresses a direction perpendicular to the substrate. For example, the second substrate 102 is positioned above the first substrate 101. Also, "below (or under)" is the direction opposite to above (or on). In addition, the horizontal direction is a direction parallel to the line A-A' in FIG. 2 in the substrate plane.

The first and second substrates 101 and 102 are made of a transparent material and have a flat shape. That is, the first and second substrates 101 and 102 can transmit light.

The second electrodes 104 are made of a conductor and extend by a given length in a first direction on the first substrate 101. The second electrodes 104 are divided into a second number of groups, and each group includes a plurality of second electrodes 104. The end portions of the plurality of second electrodes 104 in each group are electrically connected by the second extraction electrode 105 in a second direction different from the first direction. The second electrodes 104 connected by one second extraction electrode 105 belong to the same group. Consequently, the second electrodes arranged in the second direction form the same group. Note that the first and second directions are perpendicular to each other in this embodiment.

The dielectric material 108 is stacked on the first substrate 101 and second electrodes 104. The first electrodes 103 are arranged to extend in the first direction on the dielectric material 108. The dielectric material 108 is an insulating layer for preventing electrical conduction between the first and second electrodes. The first electrodes 103 are divided into a first number of groups, and each group includes a plurality of first electrodes 103. The end portions of the plurality of first electrodes 103 in each group are electrically connected. By contrast, different groups are not electrically connected.

The extending direction of the first electrodes 103 and that of the second electrodes 104 are the same. In the horizontal direction of the substrate, one second electrode 104 is formed in a position (for example, a central position) between two adjacent first electrodes 103. That is, the first and second electrodes 103 and 104 are alternately arranged in the horizontal direction. In the example shown in FIG. 1, five second electrodes 104 are arranged between six first electrodes 103. Two adjacent first electrodes 103, one second electrode 104 positioned between the two first electrodes 103, and one third electrode 106 positioned above the second electrode 104 form a set, and a region where a region defined by the two first electrodes 103 overlaps one third electrode 106 is one unit region of partial display. The example shown in FIG. 1 includes 15 unit regions.

Note that in this embodiment, no third electrode 106 is formed immediately above the second extraction electrode 105. Note also that when viewed from the upper surface, the second electrodes 104 are formed so as not to extend into the gaps between the third electrodes 106.

Furthermore, the second extraction electrodes are formed between the first substrate 101 and dielectric material 108.

The liquid crystal 107 is a liquid crystal showing uniaxial birefringence, and filled between the second substrate 102 and the stack of the dielectric material 108 and first electrodes 103. The third electrodes 106 are stacked on that side of the second substrate 102, which faces the liquid crystal 107.

The third electrodes 106 are made of a conductor, and extend by a given length in the second direction on the second substrate 102. For example, the third electrodes 106 extend in the second direction from one end to the other of the second substrate 102. The number of third electrodes 106 is the second number as the number of groups of the second electrodes 104. Each third electrode 106 corresponds to one group of the second electrodes 104. As another example, it is also possible to further split each third electrode 106 into two portions to make the number of third electrodes 106 twice the second number as compared with the example shown in FIG. 1.

The first address voltage supply unit 111 is electrically connected to the second extraction electrode 105 of the first group, and the third electrode 106 positioned above the second extraction electrode 105. The second address voltage supply unit 112 is electrically connected to the second extraction electrode 105 of the second group, and the third electrode 106 positioned above the second extraction electrode 105. The third address voltage supply unit 113 is electrically connected to the second extraction electrode 105 of the third group, and the third electrode 106 positioned above the second extraction electrode 105. When the third electrode 106 is split into two portions, the ith address voltage supply unit (i=1, 2, 3) is electrically connected to the second extraction electrode 105 of the ith group, and the split electrodes positioned above the second extraction electrode 105, and sets the connection destinations at the same predetermined potential. Note that the second extraction electrodes 105 of a plurality of groups may also be connected to each address voltage supply unit.

The first column voltage supply unit 114 is electrically connected to the first electrodes 103 of the first group, and the second column voltage supply unit 115 is electrically connected to the first electrodes 103 of the second group. The first and second column voltage supply units 114 and 115 set the respective connection destinations at the same predetermined potential.

The polarizing plate 109 is set below the first substrate 101, and the two-dimensional image display device 110 is set below the polarizing plate 109. The two-dimensional image display device 110 includes pixels arranged in a matrix, and a presently normally used display device is applicable. Note that the arrow on the polarizing plate 109 shown in FIG. 1 indicates the polarizing direction. The two-dimensional image display device 110 may also include the polarizing plate 109.

Note that in the example shown in FIG. 1, the first number as the number of groups of the first electrodes 103 is 2, and the second number as the number of groups of the second electrodes 104 is 3. However, these numbers are merely examples and can properly be changed in accordance with the size of the display screen, the size of a partial display region, or the like.

Next, switching (2D/3D switching) between two-dimensional display and three-dimensional display will be explained.

Figure 5:
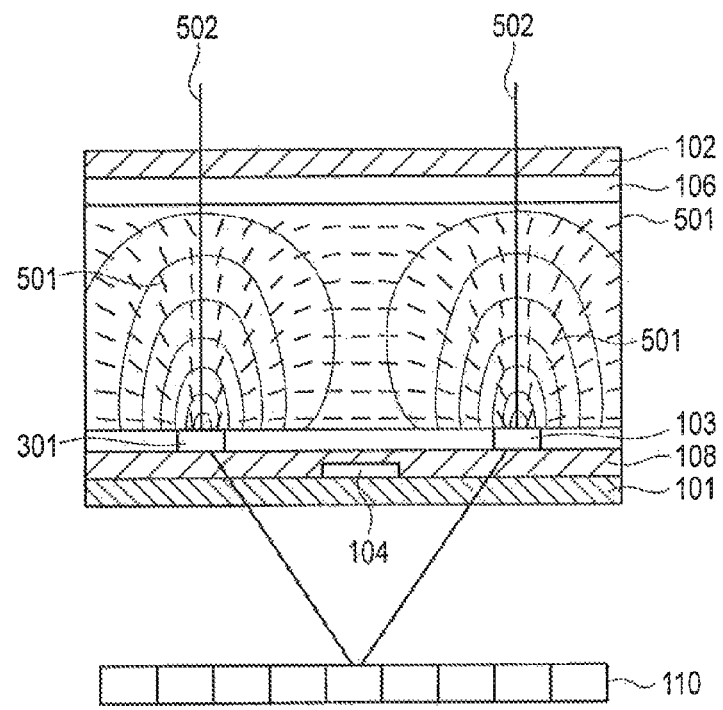
FIG. 5 is a sectional view showing a liquid crystal director distribution when using an electrode structure and voltage that make the lens function of a lens shown in FIG. 3 effective.

FIG. 5 shows an electric field distribution and liquid crystal director distribution when a voltage is applied to the liquid crystal lens array element having the section shown in FIG. 3. Light 502 emitted from the two-dimensional image display device 110 enters the liquid crystal lens array element.

Figure 6:
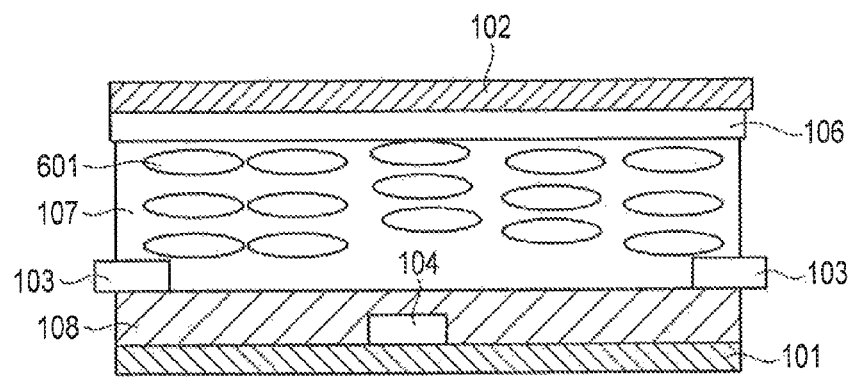
FIG. 6 is a view showing a liquid crystal director distribution when applying no voltage to the second and third electrodes in the lens shown in FIG. 3.

FIG. 6 is a sectional view of FIG. 3 in which the liquid crystal 107 is filled. FIG. 6 shows the initial orientation before the voltage is applied to each electrode. The initial orientation direction of the liquid crystal is the horizontal direction, and is a lens pitch direction in this embodiment. That is, this direction is perpendicular to the first direction in which the first and second electrodes extend, and is the second direction.

Some liquid crystal has a long, narrow molecular structure. Because of this structure, the liquid crystal lens array element of this embodiment has different refractive indices when light whose polarizing direction is the same as the direction of directors 501 of the liquid crystal long axis enters, and when light whose polarizing direction is the same as the direction of the directors 501 of the liquid crystal short axis.

On the dielectric material 108 on the first substrate 101, a voltage V1on is applied to the first electrode 103 positioned at the lens edge, and a voltage V2on is applied to the second electrode 104 positioned at the lens center, thereby applying optimum voltages for the liquid crystal layer to achieve the lens effect by setting V1on>V2on. When the voltages are thus applied to the liquid crystal lens array element having the section shown in FIG. 3, the directors 501 of the liquid crystal gradually rise from the center to the edge of the lens. This makes it possible obtain the highest refractive index at the lens center, and the lowest refractive index at the lens edge.

The refractive index profile of the lens shown in FIG. 5 will be explained below with reference to FIG. 7.

An ideal refractive index profile is represented by the following equation. Let Y be a coordinate in the lens pitch direction, Ne be the refractive index of the liquid crystal molecule in the long-axis direction, No be the refractive index of the liquid crystal molecule in the short-axis direction, and Ne—No be the birefringence of the refractive index of the liquid crystal. Assuming that lenses are formed from $-Y_0$ to $+Y_0$ as coordinates and the lens pitch is $2Y_0$, the ideal refractive index profile is represented by $$n(Y) = N_e - \left(\frac{N_e - N_o}{Y_o^2}\right)Y^2$$

Figure 7:
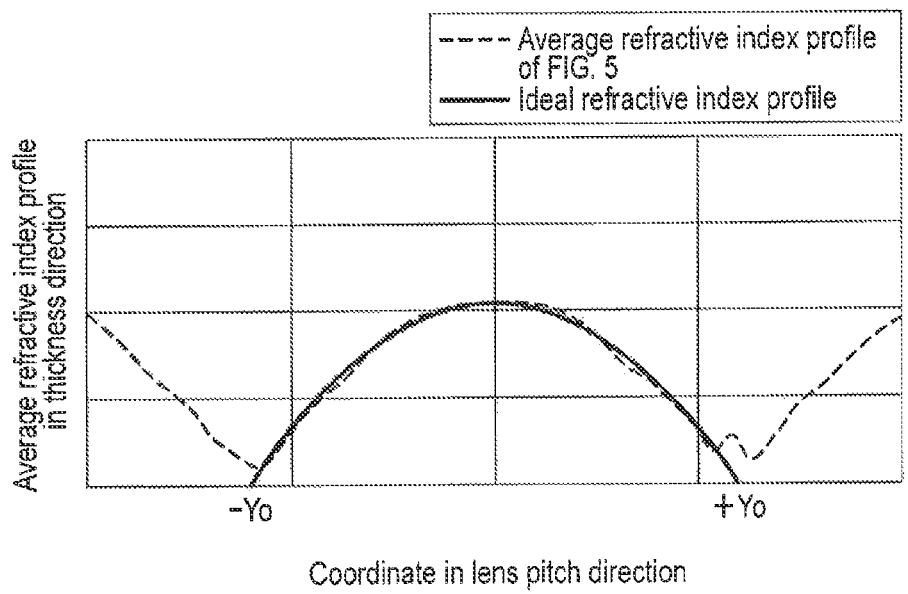
FIG. 7 is a graph showing an average refractive index profile in the thickness direction calculated from the liquid crystal director distribution shown in FIG. 5, and an ideal refractive index profile.

As shown in FIG. 7, the liquid crystal GRIN lens shown in FIG. 5 is close to the ideal refractive index profile. As shown in FIG. 5, therefore, light rays 502 having entered parallel within the lens pitch can efficiently be concentrated to a pixel. This makes it possible to emit one parallax image component in a desired direction. Consequently, a naked-eye 3D display can be implemented by preventing display deterioration caused by the mixture of two parallaxes at an angle at which one of them should be seen.

A case in which no lens effect appears will be explained below. In the section shown in FIG. 3, a voltage V1off is applied to the first electrodes 103 and a voltage V2off is applied to the second electrodes 104 on the dielectric material 108 on the first substrate 101, and (V1off−V2off) is set to be less than or equal to a voltage Vth at which the liquid crystal rises. Consequently, the liquid crystal becomes parallel to the orientation surface, and no liquid crystal directors rise. Since this produces no refractive index profile as a lens, a 2D image can be displayed.

Next, a case in which V1on is applied to a given group of the first electrodes 103, V1off is applied to other groups, V2on is applied to a given group of the second electrodes 104, and V2off is applied to other groups will be explained. The operation of a region where V1on is applied to the first electrodes 103 and V2on is applied to the second electrodes 104 is the same as described above. Also, the operation of a region where V1off is applied to the first electrodes 103 and V2off is applied to the second electrodes 104 is the same as described above. On the other hand, a region where V1on is applied to the first electrodes 103 and V2off is applied to the second electrodes 104 is produced. A region where V1off is applied to the first electrodes 103 and V2on is applied to the second electrodes 104 is also produced. In this state, a 2D image can be displayed in these regions by making (V1on−V2off) and (V1off−V2on) less than or equal to the above-described voltage Vth at which the liquid crystal rises. Details of this driving method will be described in the second half of this embodiment.

Figure 8:
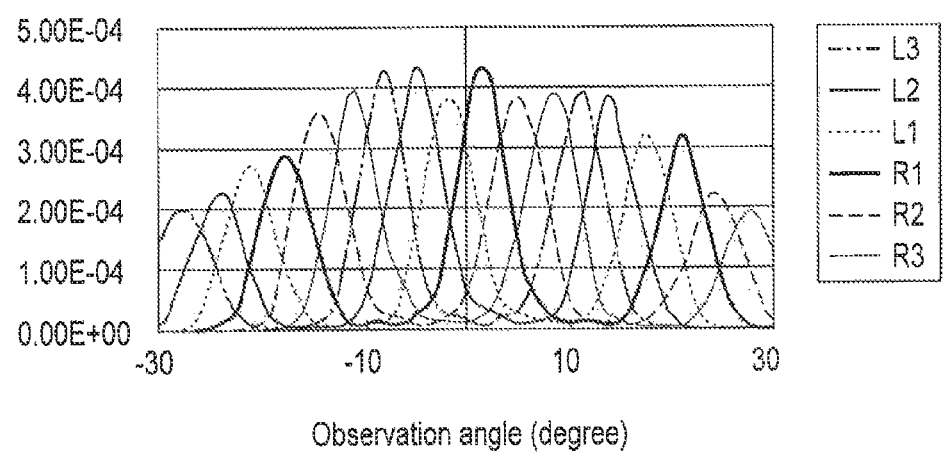
FIG. 8 is a view showing the results of luminance profile simulation when using the refractive index profile obtained from the liquid crystal director distribution shown in FIG. 5.

FIG. 8 shows the results of simulation performed on the luminance profiles of parallax rays (light rays for forming a parallax image) by ray tracing by the Monte Carlo method by using the refractive index profile obtained from the liquid crystal director distribution shown in FIG. 5.

In this example, six parallax rays can be separated. This demonstrates that the stereoscopic image display device shown in FIG. 1 can implement a naked-eye 3D display having a high parallax ray separation degree.

The driving method for performing 2D/3D switching by using the liquid crystal lens array element shown in FIG. 1 will now be explained.

In the conventional one-dimensional lens array, power supply electrodes (corresponding to the first electrodes) and ground electrodes (corresponding to the second and third electrodes) of liquid crystal GRIN lenses are repetitively formed in only the direction in which the lenses are arranged. Consequently, a partial 3D window can be split in the horizontal direction but cannot be split in the vertical direction.

To solve these problems, the power supply electrodes (a high voltage) are extracted in the first direction, and the ground electrodes (a low voltage) are extracted in the second direction. In addition, to insulate these electrodes from each other, an insulating layer is formed between the electrodes on the first substrate 101. As this insulator, it is favorable to use an insulator to be used when forming the conventional liquid crystal display, because the reliability for the liquid crystal material increases.

Next, divided regions for driving the liquid crystal lens will be described. For example, the second electrodes 104 can be divided into three regions G1, G2, and G3 in the first direction in FIG. 1. The first, second, and third address voltage supply units 111, 112, and 113 are respectively connected to regions G1, G2, and G3. Regions G1, G2, and G3 can electrically be connected by extraction lines outside the substrate. Accordingly, the third electrodes can electrically be connected, via the liquid crystal, not only to the second electrodes around the glass substrate as in the conventional device, but also to the inside second electrodes.

Referring to FIG. 1, the first electrodes 103 are divided into two regions S1 and S2 corresponding to the first and second column voltage supply units 114 and 115. The first electrodes 103 are preferably extracted in the first direction. Referring to FIG. 1, the electrodes are divided into two portions in the horizontal direction, and three portions in the vertical direction. Consequently, different voltages can be applied in a total of six divided regions.

First, partial 3D display in one window by which the ratio of ON voltage/OFF voltage of the lens can be made highest will be described.

Figure 9:
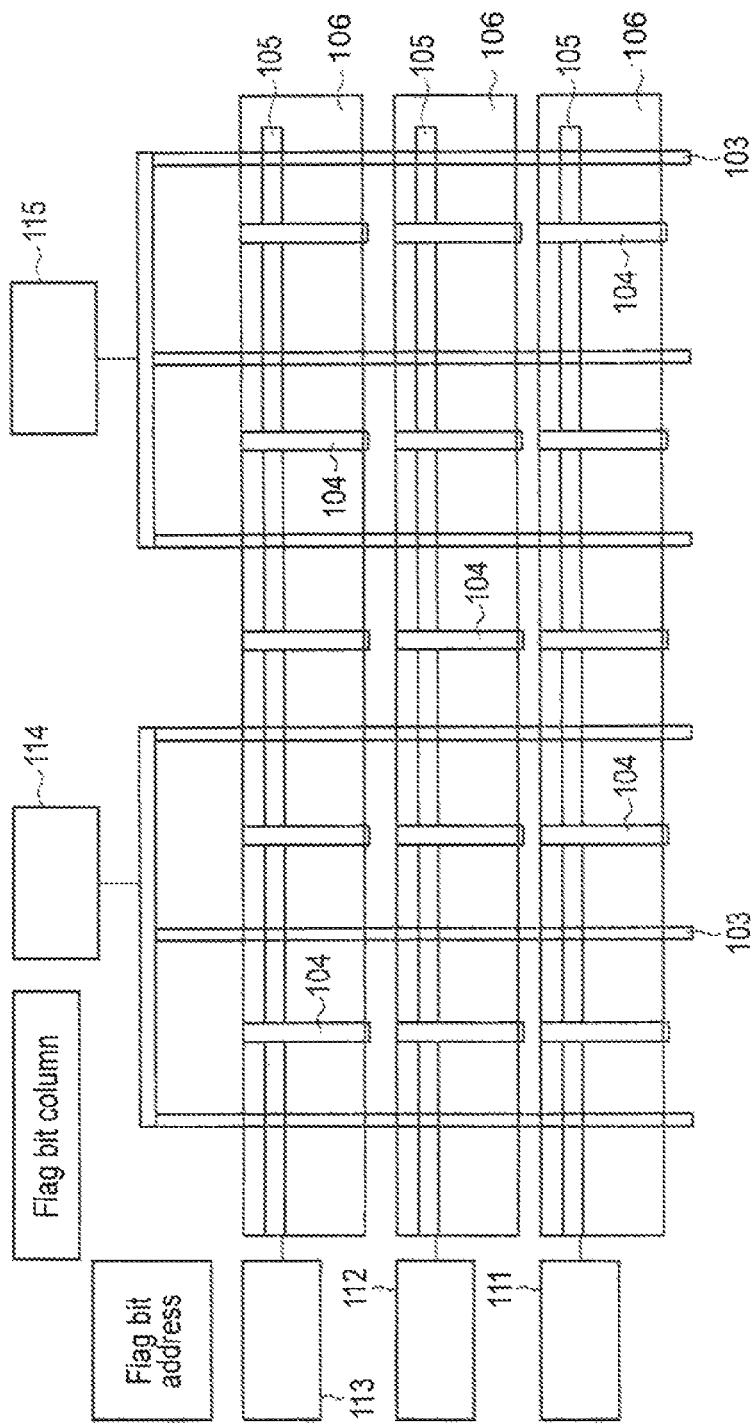
FIG. 9 is a view for explaining a driving method of the first embodiment.

FIG. 9 is a perspective view showing the liquid crystal GRIN lens shown in FIG. 1 from above. FIG. 9 shows a matrix structure.

Figures 10, 11:
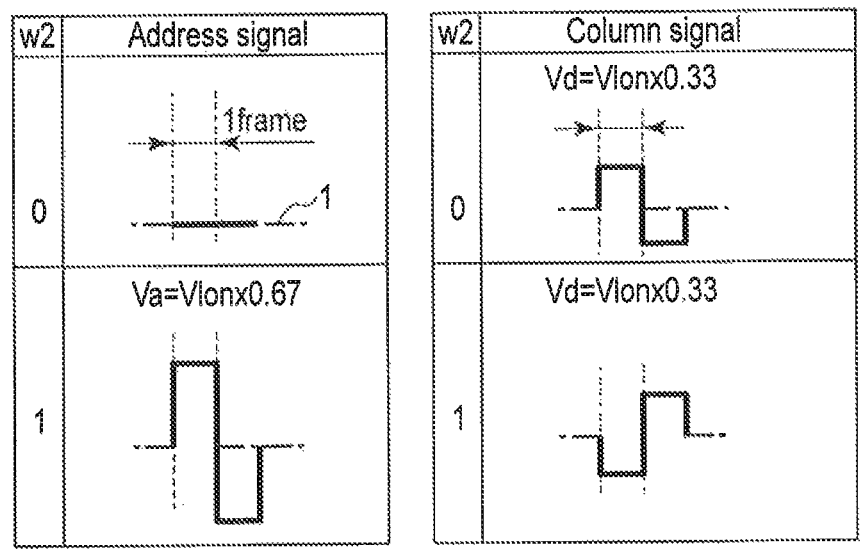
FIG. 10 is a view showing voltage waveforms to be applied to perform partial 3D display in the stereoscopic image display device shown in FIG. 9, and flag bits corresponding to the voltages.
FIG. 11 is a table showing flag bits of an address and column when the voltages shown in FIG. 10 are applied, and the feasibility of 3D display.

In a simple matrix driving liquid crystal panel, the contrast generally decreases as the number of electrode lines increases. A driving method using a flag bit is proposed for the liquid crystal GRIN lens cell shown in FIG. 9. A flag bit is set to distinguish between the outside and inside of a 3D window. "0" or "1" is supplied as a flag bit to all address lines and column lines. Note that "an address line" means a line connected to each address voltage supply unit. Likewise, "a column line" means a line connected to each column voltage supply unit. As shown in FIG. 10, the address line and column line each require only two different kinds of waveforms. By thus setting "1" as the flag bits of both the address and column, a voltage at which the liquid crystal directors rise is obtained, and a 3D display area is formed. In other cases, the voltage becomes lower than the threshold value, and a 2D display area is formed.

The thickness of a liquid crystal layer of a liquid crystal lens is often larger than the liquid crystal thickness of an ordinary liquid crystal display, and this sometimes raises the driving voltage. When the voltages as shown in FIG. 10 are applied, Von/Voff=3 holds. For example, Voff=1.67 V when Von=5 V. Also, Va=3.35 V and Vd=1.65 V in FIG. 10. When Voff=1.67 V, a voltage at which the liquid crystal directors do not rise is desirable. For example, it is favorable to select a liquid crystal by which Vth>Voff.

Note that the threshold voltage Vth at which a liquid crystal rises by bend deformation is represented by the following equation (Katsumi Yoshino, "Fundamental of Liquid crystal and Display", pp. 66-71).

$$V_{th} = \pi \sqrt{\frac{K_{33}}{\varepsilon_0 \varepsilon_a}} \quad (1\text{-}1)$$

Also, a threshold voltage at which a liquid crystal rises by spray deformation when Freedericksz transition occurs with no twist is represented by $$V_{th} = \pi \sqrt{\frac{K_{11}}{\varepsilon_0 \varepsilon_a}} \quad (1\text{-}2)$$

In the liquid crystal GRIN lens, both the spray deformation and bend deformation of the liquid crystal act in some place, so it is possible to consider a voltage of about the average. $K_{11}$ is an elastic constant for the spray deformation of the liquid crystal, $K_{22}$ is an elastic constant for the twist deformation of the liquid crystal, and $K_{33}$ is an elastic constant for the bend deformation of the liquid crystal. Also, $\varepsilon_0$ is the dielectric constant of a vacuum, and $\varepsilon_a$ is the dielectric anisotropy ($\varepsilon$[horizontal]−$\varepsilon$[vertical])

Furthermore, even when Voff slightly exceeds Vth and the lens effect slightly appears and concentrates light, this is an allowable range of 2D display.

Next, a case in which two or more 3D windows exist will be explained.

Figure 12:
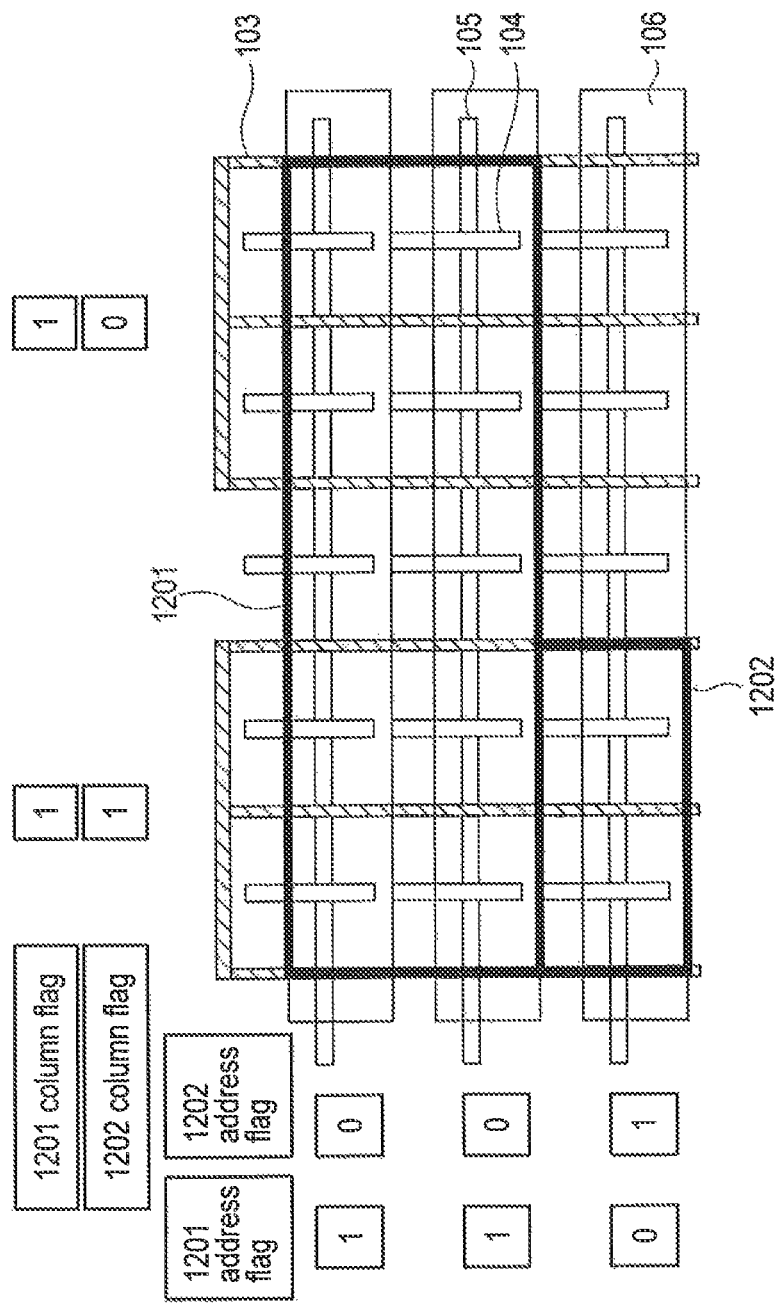
FIG. 12 is a view showing flag values in an address portion and column portion when displaying two partial 3D windows.

FIG. 12 shows a plan view of a partial 3D display when a 2D window is overlaid on a 3D window, and the address and column flags of window 1201 and window 1202. Since the 3D window and 2D window have a vertical relationship, a partially chipped partial 3D image can be displayed when displaying two windows.

First, to increase the focusing performance of the liquid crystal GRIN lens, an optimum voltage at which a good refractive index profile is obtained must be applied to the liquid crystal GRIN lens. A voltage V1on at which the lens operates has a width of ΔV1on. In a 3D display region, therefore, a voltage is applied to the liquid crystal within the voltage range of V1on=V1oncenter±ΔV1on.

Figure 13:
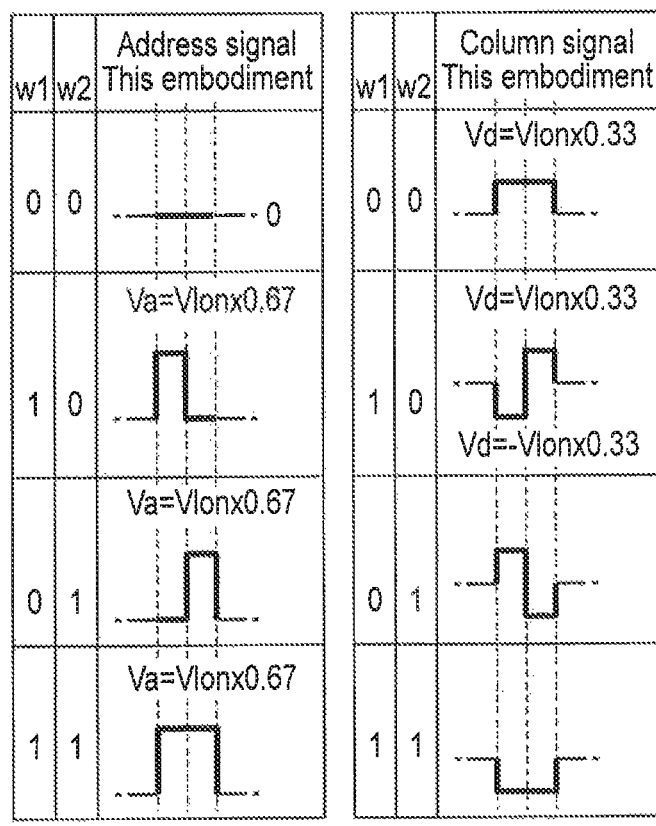
FIG. 13 is a view showing voltage waveforms to be applied to display two windows, and flat bits corresponding to the voltages.

When displaying two windows, as shown in FIG. 13, lenses in different window portions can be operated in the first half and second half of a pulse by applying a pulsed voltage. The following voltage values are reference values, but fine adjustment is necessary.

Letting V1on be a voltage at which a refractive index profile that maximizes the focusing performance of the liquid crystal GRIN lens shown in FIG. 1 is obtained, Va be the absolute value of a voltage to be applied to the address, and Vd be the absolute value of a voltage to be applied to the column, voltages as shown in FIG. 14 are applied to the liquid crystal when voltages as shown in FIG. 13 are applied. For example, when (Va+Vd) and Vd are applied to the liquid crystal in the first half and second half, respectively, by combining the address and column voltages having the waveforms shown in FIG. 13, the averaged voltage to be applied to the liquid crystal is represented by $$\sqrt{\frac{(Va+Vd)^2}{2} + \frac{Vd^2}{2}}$$

Also, when Vd and Vd are applied to the liquid crystal in the first half and second half, respectively, of the waveform by combining the address and column voltages having the waveforms shown in FIG. 13, the averaged voltage to be applied to the liquid crystal is represented by Vd.

Therefore, $$V1on\_center - \Delta V1on < \sqrt{\frac{(Va+Vd)^2}{2} + \frac{Vd^2}{2}} < V1on\_center + \Delta V1on$$

In addition, Va and Vd are preferably set such that Vd is equal to, less than, or close to the threshold voltage at which the liquid crystal starts rising, and the following equation holds.

$$Va = 2 \times Vd$$

Furthermore, when the addresses of both W1 and W2 are turned on as shown in FIG. 14, the averaged voltage is represented by $$Va + Vd$$

This means that there is a case in which three types of voltages are applied to the liquid crystal. The driving waveform is difficult to set because there is a case in which a voltage value other than V1on (the 3D display mode) and V1off (the 2D display mode) is applied. As shown in FIG. 12, therefore, regions are set so that the address numbers of window 1 and window 2 are not simultaneously turned on.

The conditions of the frame frequency when applying a pulsed voltage will be described below. When applying a pulsed (intermittent) voltage, if the voltage application time is too short, the voltage OFF time comes before the liquid crystal sufficiently rises, so the application of even the optimum voltage is insufficient. Accordingly, the time during which the optimum voltage must be applied to the liquid crystal will be described below. On the other hand, the time during which the liquid crystal falls is longer than the time during which the liquid crystal rises. Especially when the thickness of the liquid crystal is 30 μm or more, a 2D/3D switching display using the liquid crystal GRIN lens sometimes apparently takes 1 second or more until the liquid crystal sufficiently rises and displays a 2D image.

Even when applying a pulsed (intermittent) voltage, therefore, 3D display can be maintained by applying an optimum voltage at which the liquid crystal rises, before the liquid crystal falls. In an ordinary TN LCD, so-called flicker is no longer seen when 60 Hz more is applied. When using the liquid crystal GRIN lens, no flicker is seen even at a frequency lower than that, but there is a limit even when the frequency is lowered. Accordingly, the driving conditions of the liquid crystal GRIN lens are determined.

First, a rise time ton and fall time toff of a liquid crystal depending on the thickness and type of the liquid crystal when Freedericksz transition occurs with respect to twist deformation without any barycenter movement of liquid crystal molecules will be presented below (Katsumi Yoshino, "Fundamental of Liquid crystal and Display", p. 101).

$$t_{off} = \frac{\gamma d^2}{\pi^2 K_{22}} \quad (2)$$

$$t_{on} = \frac{\gamma d^2}{\varepsilon_0 \varepsilon_a (V^2 - V_{th}^2)} \quad (3)$$

$$t_{on}/t_{off} = \frac{\pi^2 K_{22}}{\varepsilon_0 \varepsilon_a (V^2 - V_{th}^2)} \quad (4)$$

where γ indicates a rotational viscosity coefficient [Pa·sec], V indicates a voltage to be applied to the liquid crystal, Vth indicates the threshold voltage of the liquid crystal, and d indicates the thickness of the liquid crystal.

The foregoing reveals the following conditions.

(1) The rise time and fall time of a liquid crystal prolong in proportion to the square of the thickness.

(2) When the voltage remains the same, the ratio of the rise time to the fall time of a liquid crystal is determined by a value unique to the liquid crystal, and independent of the thickness of the liquid crystal.

As described above, to impart good lens characteristics to a liquid crystal, the directors of the liquid crystal must sufficiently rise at the edge of the lens.

When performing partial 3D display in two or more windows by using the liquid crystal GRIN lens, voltage V1on for approaching an ideal refractive index profile for 3D display is preferably applied for at least a time represented by the following expression during pulse driving.

$$\frac{\gamma d^2}{\varepsilon_0 \varepsilon_a (V_{Ion}^2 - V_{th}^2)}$$

In this embodiment, the first electrodes 103 are arranged as they are divided into the first number of groups. However, the first number may also be the same as the number of first electrodes 103. In this case, the groups of the first electrodes 103 each include one first electrode 103.

Also, the first electrodes 103 and second electrodes 104 are alternately arranged along the second direction in this embodiment, but the present embodiment is not limited to this. For example, the first electrodes 103 may also be arranged as they are divided into a plurality of electrodes, or the second electrodes 104 may also be arranged as they are divided into a plurality of electrodes. In addition, a plurality of second extraction electrodes 105 may also be connected to each second electrode 104. It is also possible to add electrodes other than the first electrodes 103 and second electrodes 104 to the first substrate 101.

Furthermore, the layout of the first electrodes 103, second electrodes 104, and second extraction electrodes 105 in the vertical direction, i.e., the thickness direction is not limited to this embodiment. As an example, the second electrodes 104 and second extraction electrodes 105 are formed in the same layer in the above explanation, but the present embodiment is not limited to this, and they may also be formed in different layers. However, the second extraction electrodes 105 are preferably formed between the first substrate 101 and dielectric material 108. This is so because the display quality can be increased by suppressing the disturbance of an electric field caused by the second extraction electrodes 105.

In this embodiment, each address voltage supply unit is electrically connected to the second extraction electrode of each group and the third electrode positioned above this second extraction electrode. However, the present embodiment is not limited to this arrangement, and the second extraction electrode of each group and the third electrode positioned above this second extraction electrode may also be connected to different voltage supply units. Furthermore, it is unnecessary to apply completely the same voltage to the second extraction electrode of each group and the third electrode positioned above this second extraction electrode. Voltages within an appropriate range can properly be determined by taking account of the relationship between each voltage to be applied to the first and second electrodes and voltage Vth at which the liquid crystal rises. Since, however, the second extraction electrode of each group and the third electrode positioned above this second extraction electrode can be driven by the same voltage, the number of voltage supply units can be reduced by applying the same voltage supply unit. This can achieve a low cost.

Next, a means for electrically connecting the second extraction electrode of each group and the third extraction electrode positioned above this second extraction electrode will be explained. In the above-described embodiment, the lines are extracted from the first and second substrates and connected to the voltage supply units. However, the present embodiment is not limited to this.

Figure 15:
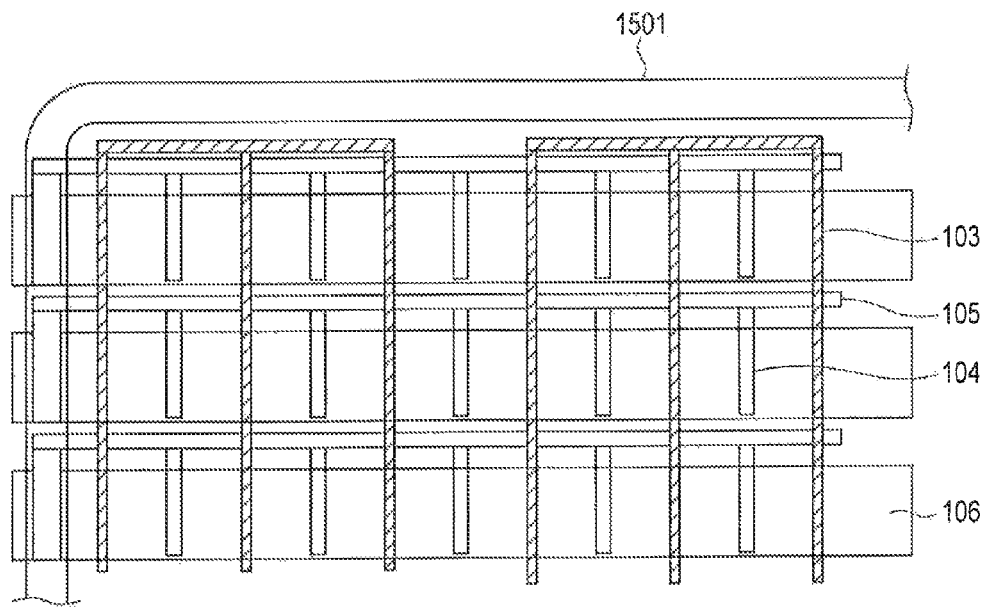
FIG. 15 is a plan perspective view when a conductive sealing member is applied to the liquid crystal lens array element of this embodiment.

As an example, there is a method of giving conductivity to a sealing member for holding the liquid crystal layer in the gap between the first and second substrates. This conductive sealing member is obtained by mixing fine conductive particles in, for example, an epoxy-based sealing member. Although the connection resistance between the substrates is low, the connection resistance in the substrate plane is high. Consequently, it is possible to preferably implement an electrical connection between the substrates. FIG. 15 is a plan view when the second extraction electrode of each group and the third electrode positioned above this second extraction electrode are electrically connected by using this conductive sealing member. A conductive sealing member 1501 is formed between the second extraction electrode and third electrode. Also, this conductive sealing member is formed to surround the region that functions as a lens array, in order to hold the liquid crystal layer. A method using this conductive sealing member can achieve an electrical junction of each substrate by using the sealing member for holding the liquid crystal layer, and hence has a large effect especially when a large number of electrical junctions must be implemented as in this embodiment. This method can largely simplify the manufacturing process, and reduce the cost.

Furthermore, as another means, there is a method of forming a conductive paste material between the second extraction electrode and third electrode. When the above-described conductive sealing member is used, it is possible to hold the liquid crystal layer and obtain an electrical junction of each substrate at the same time. When using the conductive paste material, however, it is necessary to form the conductive paste material in addition to the sealing member for holding the liquid crystal layer, and this increases the number of manufacturing steps. On the other hand, when using the conductive paste material, it is possible to select a material having a connection resistance lower than that of the conductive sealing member. This makes it possible to suppress an unnecessary voltage drop, and increase the display quality.

In this embodiment, the initial orientation of the liquid crystal is horizontal orientation in the horizontal direction. However, the liquid crystal orientation is not limited to this, and another liquid crystal mode is applicable.

Also, a gradient index liquid crystal optical device operates as the liquid crystal lens array element in this embodiment, but the present embodiment is not limited to this. The optical element need only have performance for implementing 3D display. For example, the optical element need not achieve a refractive index profile as a perfect lens, and may also function as a prism array element.

Second Embodiment

Figure 16:
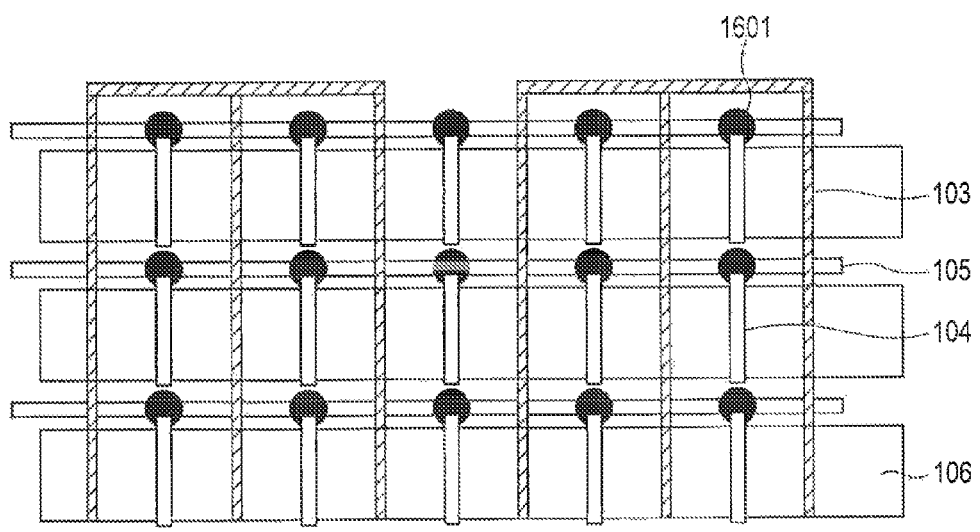
FIG. 16 is a plan perspective view showing a liquid crystal lens array element of the second embodiment.

A liquid crystal lens array element of this embodiment will be explained below with reference to FIG. 16. FIG. 16 is a plan perspective view showing the liquid crystal lens array element of this embodiment in a direction perpendicular to a substrate.

The difference of the liquid crystal lens array element of this embodiment from the liquid crystal lens array element described in the above-mentioned first embodiment is the arrangement of second electrodes 104. In the above-described first embodiment, the second electrodes 104 are formed in the same layer as that of the second extraction electrodes 105. That is, the second electrodes 104 are formed between the first substrate 101 and dielectric material 108.

In this embodiment, however, the second electrodes 104 are formed between a dielectric material 108 and liquid crystal layer 107. On the other hand, second extraction electrodes 105 are formed between a first substrate 101 and the dielectric material 108. In addition, contact holes 1601 are formed in the dielectric material 108, and electrically connect the second electrodes 104 and second extraction electrodes 105.

In this embodiment, first electrodes 103 and the second electrodes 104 can be formed in the same layer. Consequently, the accuracy of the relative positions of the electrodes can be increased compared to the arrangement in which these electrodes are formed in different layers as described in the aforementioned first embodiment. This makes it possible to increase the performance of the liquid crystal lens array element, and improve the display quality.

The rest of the arrangement, operation, and effect of this embodiment are the same as those of the above-described first embodiment.

Third Embodiment

Figure 17:
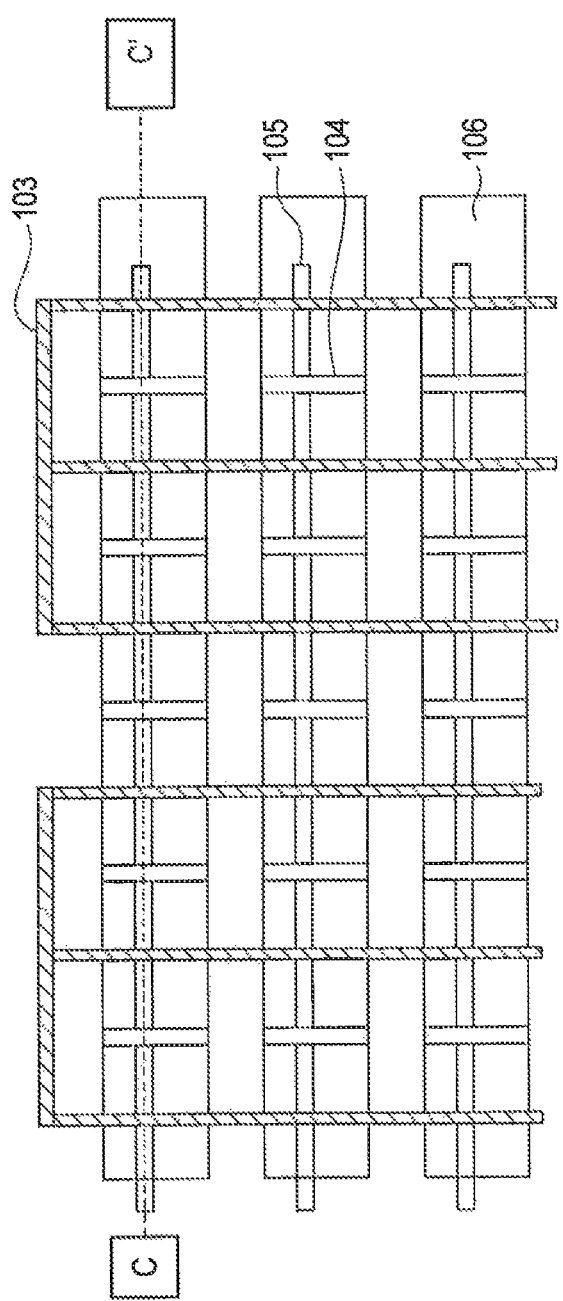
FIG. 17 is a plan perspective view showing a liquid crystal lens array element of the third embodiment.
Figure 18:
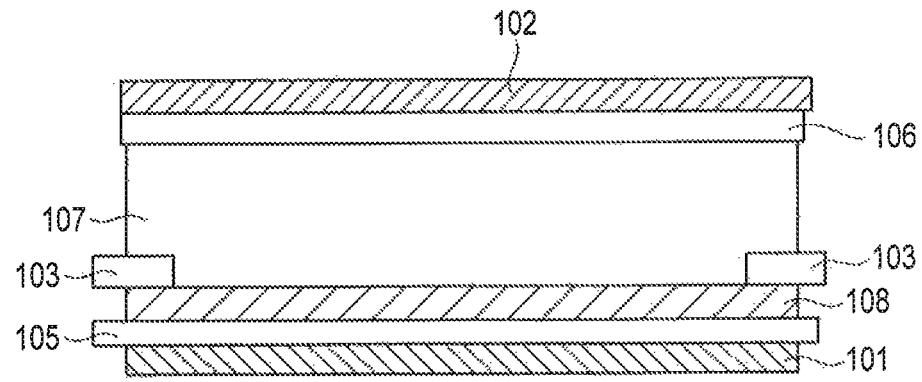
FIG. 18 is a sectional view taken along line C-C' in FIG. 17.
Figure 19:
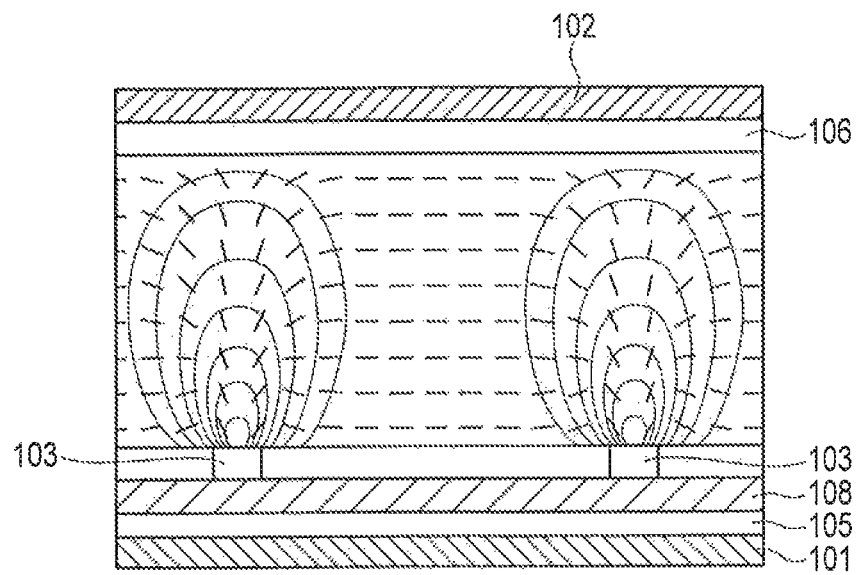
FIG. 19 is a sectional view showing a liquid crystal director distribution when applying a voltage that makes the lens function of a lens shown in FIG. 18 effective.

A liquid crystal lens array element and stereoscopic image display device of this embodiment will be explained below with reference to FIGS. 17, 18, and 19. FIG. 17 is a plan perspective view taken in a direction perpendicular to a substrate. FIG. 18 is a sectional view taken along line C-C' in FIG. 17. FIG. 19 is a sectional view showing an electric field distribution and liquid crystal director distribution when a voltage is applied in FIG. 18.

The liquid crystal lens array element of this embodiment differs from the liquid crystal lens array element described in the above-mentioned first embodiment in that third electrodes are formed above second extraction electrodes 105. When compared to the above-described first embodiment, this embodiment can achieve good lens characteristics even above the second extraction electrodes 105. This feature will be explained below.

Figure 21:
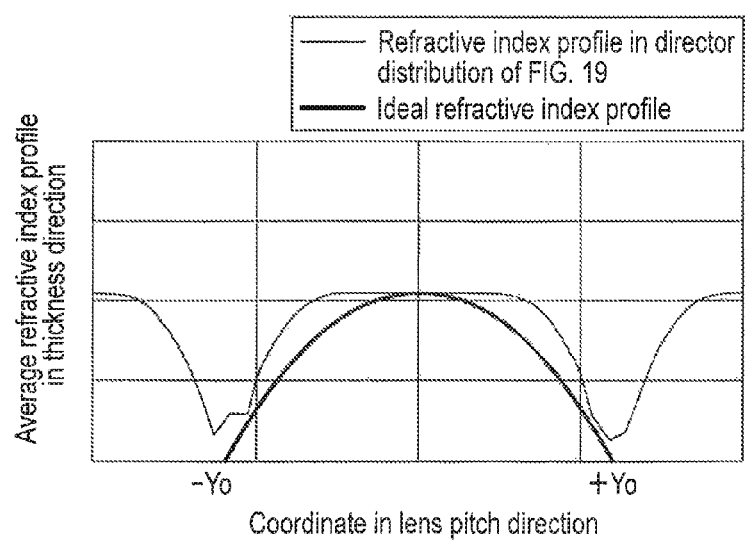
FIG. 21 is a graph showing an average refractive index profile in the thickness direction calculated from the liquid crystal director distribution shown in FIG. 19, and an ideal refractive index profile.

FIG. 21 shows the comparison of an ideal refractive index profile with an average refractive index profile calculated in the thickness direction as the lens pitch direction in the liquid crystal director distribution shown in FIG. 19. In the edge of the lens, the liquid crystal sufficiently rises, so the average refractive index profile approaches the ideal refractive index profile. In the center of the lens, however, the change in refractive index is small.

Figure 22:
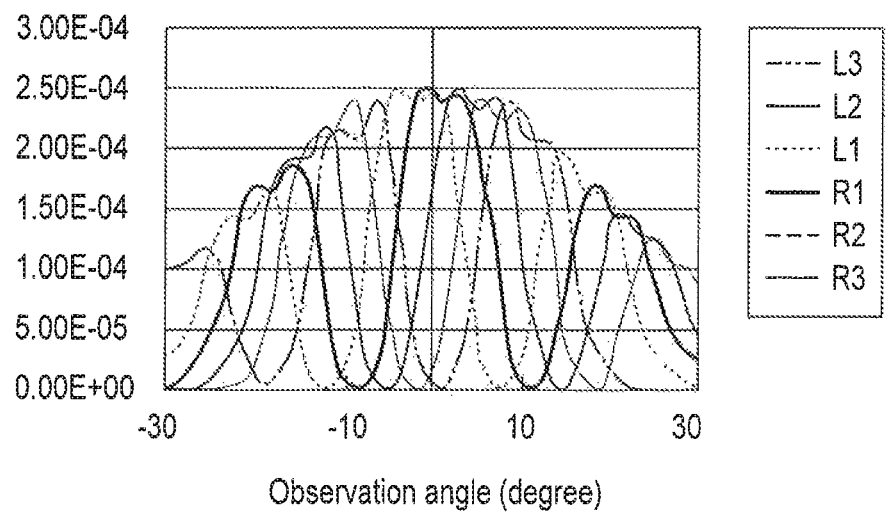
FIG. 22 is a view showing the results of luminance profile simulation when using the refractive index profile obtained from the liquid crystal director distribution shown in FIG. 19.

FIG. 22 shows the results of simulation performed on luminance profiles by ray tracing by the Monte Carlo method by using the refractive index profile in the liquid crystal director distribution shown in FIG. 19. The results indicate that parallax rays can be separated even in the refractive index profile shown in FIG. 19.

Figure 20:
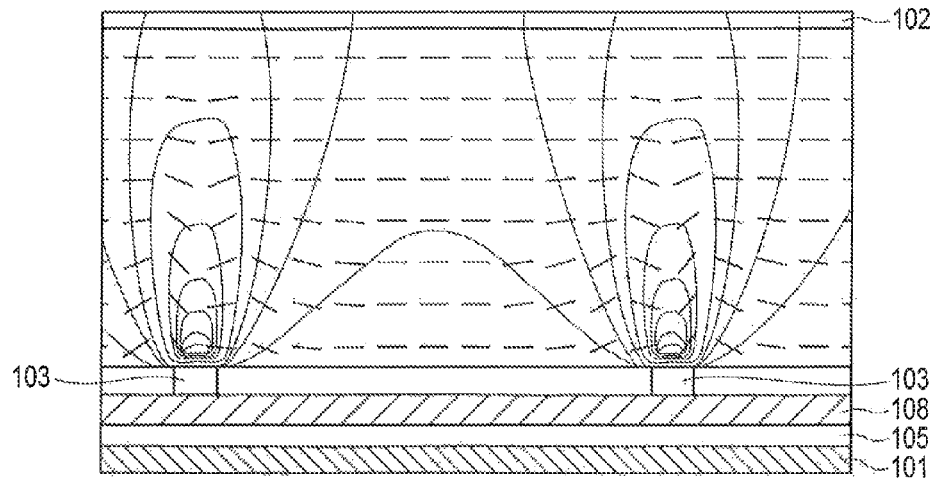
FIG. 20 is a view showing a liquid crystal director distribution in the section taken along line B-B' in FIG. 2.

On the other hand, the arrangement in which the third electrodes are not formed above the second extraction electrodes 105 as in the first embodiment shown in FIG. 4 will be described below. In this case, as shown in FIG. 20, the liquid crystal directors do not distribute so that the inclination changes toward the lens center. This is so because no third electrodes 106 exist immediately above the first electrodes 103, and the second extraction electrodes 105 exist immediately below the first electrodes 103, so the electric field is confined between the first electrodes 103 and second extraction electrodes 105, and no sufficient electric field is applied to the liquid crystal layer. Consequently, the refractive index profile shown in FIG. 20 has almost no function as the liquid crystal GRIN lens, and displays a 2D image. Accordingly, an image entirely different from that in the periphery is displayed immediately above the second extraction electrodes 105, so display deterioration in this portion becomes conspicuous.

When compared to the first embodiment described above, this embodiment can achieve better lens performance.

Figure 23:
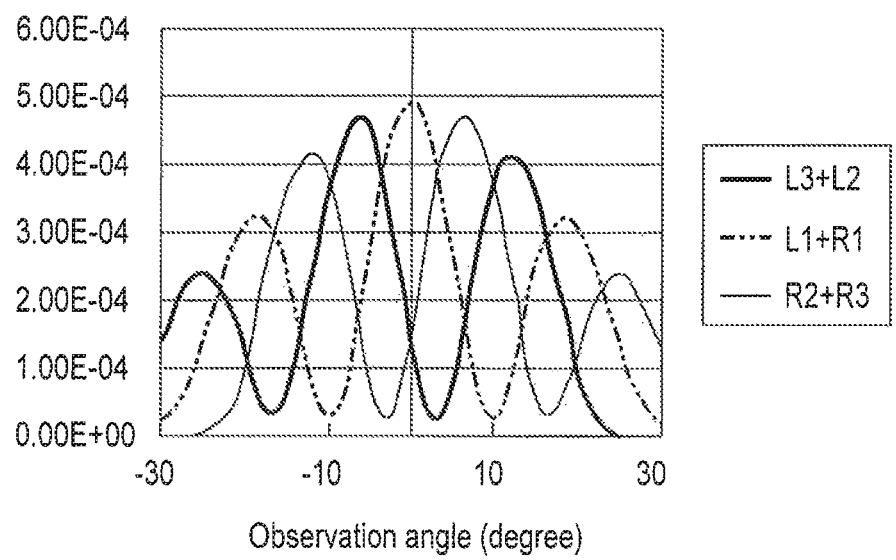
FIG. 23 is a view showing luminance profiles obtained by adding two adjacent parallax rays of parallax rays shown in FIG. 22.

Note that the display quality can also be improved by manipulating contents to be displayed. One example will be explained below. When compared to FIG. 8, the results shown in FIG. 22 reveal that one parallax ray is observed over a wide angle. That is, double images caused by crosstalk may be observed. To prevent this, as shown in FIG. 23, an image obtained by interpolating two adjacent parallax rays beforehand are output to the two images. This makes double images inconspicuous. In a 6-parallax case, for example, a parallax image between a left 3-parallax image (L3) and left 2-parallax image (L2) is output to both L3 and L2, a parallax image between a left 1-parallax image (L1) and right 1-parallax image (R1) is output to both L1 and R1, and a parallax image between a right 2-parallax image (R2) and right 3-parallax image (R3) is output to both R2 and R3. This makes it possible to reduce double images caused by crosstalk when adjacent parallaxes are seen as they are superposed in the same direction. In this example, three parallax rays can be separated.

The rest of the arrangement, operation, and effect of this embodiment are the same as those of the above-described first embodiment.

Fourth Embodiment

Figure 24:
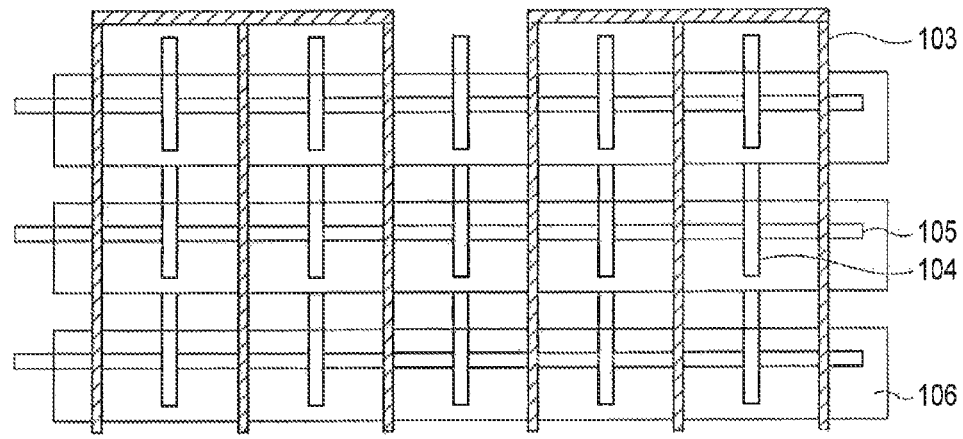
FIG. 24 is a plan perspective view showing a liquid crystal lens array element of the fourth embodiment.

A liquid crystal lens array element of this embodiment will be explained below with reference to FIG. 24. FIG. 24 is a plan perspective view showing the liquid crystal lens array element of this embodiment in a direction perpendicular to a substrate.

The difference of the liquid crystal lens array element of this embodiment from the liquid crystal lens array element described in the aforementioned first embodiment is the layout of second electrodes 104 and third electrodes 106 when viewed from the upper surface. In the first embodiment, the second electrodes 104 are so formed as not to extend into the gaps between the third electrodes 106. In this embodiment, however, the second electrodes 104 are formed to extend into the gaps between the third electrodes 106.

In this embodiment, the second electrodes 104 extending into the gaps between the third electrodes 106 achieve the lens effect in these gaps as well. This makes it possible to increase the performance, particularly, the in-plane uniformity of the liquid crystal lens array element.

The rest of the arrangement, operation, and effect of this embodiment are the same as those of the above-described first embodiment.

Fifth Embodiment

Figure 25:
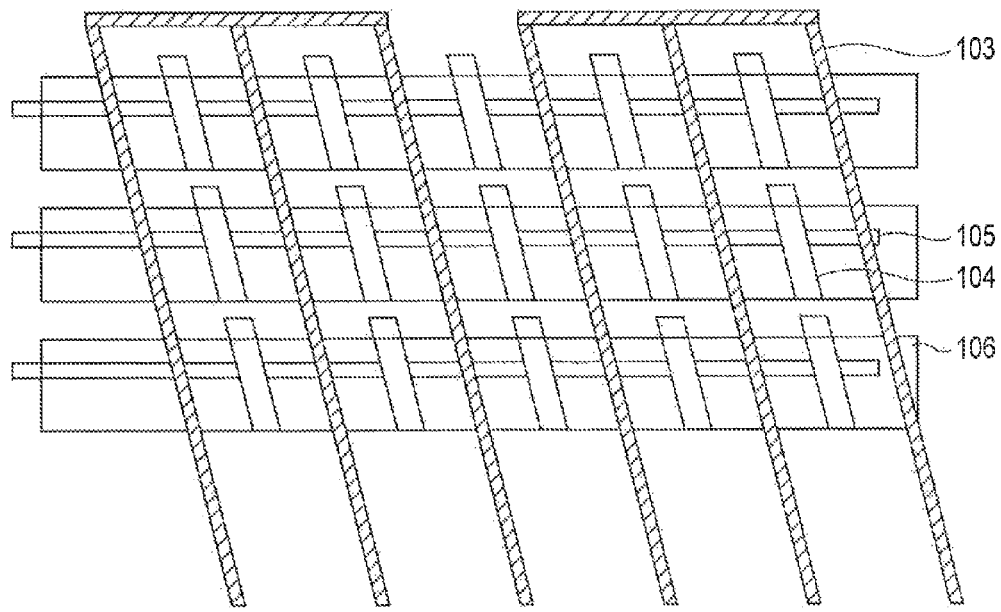
FIG. 25 is a plan perspective view showing a liquid crystal lens array element of the fifth embodiment.

A liquid crystal lens array element of this embodiment will be explained below with reference to FIG. 25. FIG. 25 is a plan perspective view showing the liquid crystal lens array element of this embodiment in a direction perpendicular to a substrate.

The liquid crystal lens array element of this embodiment differs from the liquid crystal lens array element described in the above-mentioned first embodiment in that in the first embodiment in which the angle of the first direction is different from that of the second direction when viewed from the upper surface, the first direction is perpendicular to the second direction. In this embodiment however, the first direction is not perpendicular to but inclines to the second direction.

In this embodiment as shown in FIG. 25, the second direction is the same as that in the above-mentioned first embodiment. That is, the direction in which second extraction electrodes 105 extend in this embodiment is the same as that of the first embodiment, i.e., the horizontal direction. Also, the direction in which third electrodes 106 extend is the same as that in the first embodiment, i.e., the horizontal direction. The direction in which first electrodes 103 and second electrodes 104 extend is not perpendicular to but inclines to the direction in which the second extraction electrodes and third electrodes extend.

In this embodiment, the longitudinal direction of each cylindrical lens forming the lens array can be made non-perpendicular to the second direction. Consequently, the longitudinal direction of the cylindrical lens can be inclined to the directions in which pixels are arranged in a two-dimensional image display device 110. This is so because in the ordinary two-dimensional image display device 110, the directions in which pixels are arranged are the horizontal direction and the vertical direction perpendicular to the horizontal direction. This inclined arrangement can reduce luminance moire and color moire caused by the cylindrical lenses and pixels, thereby increasing the display quality.

In addition, in this embodiment, the above-described second direction can be matched with the pixel arranging directions, particularly, the horizontal direction in the two-dimensional image display device 110. More specifically, when implementing partial 3D display, the boundary line between 2D display and 3D display inclines in the horizontal direction, but can be made horizontal in the vertical direction. Generally, partial 3D display is in many cases required to display an image in a rectangular window. This embodiment can satisfy the requirement for at least one direction.

The rest of the arrangement, operation, and effect of this embodiment are the same as those of the above-described first embodiment.

Sixth Embodiment

A liquid crystal lens array element of this embodiment will be explained below with reference to FIG. 26. FIG. 26 is a plan perspective view showing the liquid crystal lens array element of this embodiment in a direction perpendicular to a substrate.

The difference of the liquid crystal lens array element of this embodiment from the liquid crystal lens array element described in the above-mentioned fourth embodiment is the shape of first electrodes 103 when viewed from the upper surface. In the above-described fourth embodiment, the first electrodes 103 extend in the first direction. By contrast, the first electrodes 103 of this embodiment zigzag and have bent portions. That is, the first electrode 103 has a portion extending in a given direction, for example, the first direction, and a bent portion. Second electrodes 104 are also arranged along the first electrodes.

When compared to the aforementioned fourth embodiment, the longitudinal direction of each cylindrical lens forming the lens array can be made non-perpendicular to the second direction in this embodiment, as in the above-described fifth embodiment. Consequently, it is possible to reduce luminance moire and color moire caused by the cylindrical lenses and pixels, thereby increasing the display quality.

In addition, when implementing partial 3D display, the boundary line between 2D display and 3D display can be made horizontal in the vertical direction, and can also be prevented from inclining in the horizontal direction, compared to the aforementioned fifth embodiment. Consequently, this embodiment is applicable to partial 3D display requiring rectangular window display more suitably than the fifth embodiment.

Note that in this embodiment, the first electrode 103 has the portion extending in, for example, the first direction, and the bent portion. However, this embodiment is not limited to this. For example, the first electrode 103 may also have portions extending along the first direction and inclined at a predetermined angle with respect to the first direction, and bent portions for connecting the inclined portions. In this arrangement, the second electrodes 104 are similarly inclined at the predetermined angle with respect to the first direction.

The rest of the arrangement, operation, and effect of this embodiment are the same as those of the above-described fourth embodiment.

Seventh Embodiment

A liquid crystal lens array element of this embodiment will be explained below with reference to FIG. 27. FIG. 27 is a plan perspective view showing the liquid crystal lens array element of this embodiment in a direction perpendicular to a substrate.

The difference of the liquid crystal lens array element of this embodiment from the liquid crystal lens array element described in the above-mentioned first embodiment is the shape of second extraction electrodes 105 when viewed from the upper surface. In the above-described first embodiment, the second extraction electrodes 105 linearly extend in the second direction. By contrast, the second extraction electrodes 105 of this embodiment are not linearly arranged but staggered. That is, those portions of the second extraction electrodes 105, which exist between adjacent second electrodes 104 are arranged in different positions relative to the second electrodes 104.

The effect of this embodiment will be explained below. When the second extraction electrodes 105 are linearly continuously arranged as in the aforementioned first embodiment, display deterioration caused by the disturbance of an electric field by the second extraction electrodes 105 becomes conspicuous. By contrast, when the second extraction electrodes 105 are not linearly arranged as in this embodiment, portions that cause display deterioration can be scattered. This makes it possible to reduce the display deterioration and improve the display quality.

Note that when the second extraction electrodes are arranged as in this embodiment, the second direction in which the second extraction electrodes extend can also be defined as follows. That is, the second direction is a direction in which second electrodes forming the same group, i.e., second electrodes connected to each second extraction electrode are arranged.

The rest of the arrangement, operation, and effect of this embodiment are the same as those of the above-described first embodiment.

Eighth Embodiment

Figure 28:
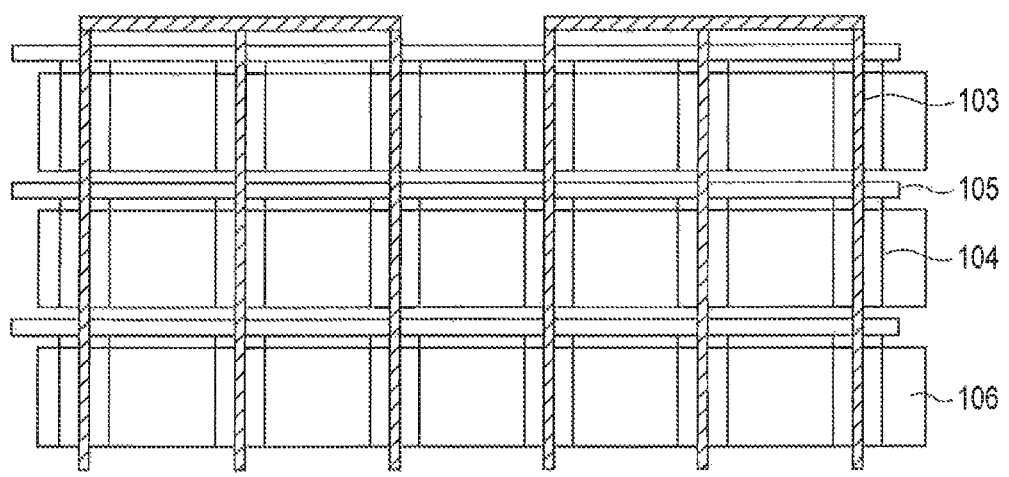
FIG. 28 is a plan perspective view showing a liquid crystal lens array element of the eighth embodiment.

A liquid crystal lens array element of this embodiment will be explained below with reference to FIG. 28. FIG. 28 is a plan perspective view showing the liquid crystal lens array element of this embodiment in a direction perpendicular to a substrate.

The difference of the liquid crystal lens array element of this embodiment from the liquid crystal lens array element described in the above-mentioned first embodiment is the shape of second electrodes 104 when viewed from the upper surface. In the above-described first embodiment, the second electrodes 104 and first electrodes 103 are alternately repetitively arranged along the second direction.

By contrast, the second electrodes 104 of this embodiment are stacked together with first electrodes. The width of the second electrode 104 is larger than that of the first electrode 103.

An electric field for achieving a refractive index profile desirable as a lens can be generated between the stack of the first and second electrodes 103 and 104 and an opposing third electrode 106 in this embodiment as well.

Next, the implementation of partial 3D display will be explained. Assume that a voltage V1H is applied to the first electrodes 103, a voltage V2H is applied to the second electrodes 104, and a voltage V3H is applied to the third electrodes 106, in order to generate a desirable electric field as described above. In this state, the above-mentioned voltages are applied to the electrodes in a region (3D display region) where the lens function is to be achieved.

To explain voltages to be applied to a 2D display region, this 2D region will be described by dividing it into three types of regions: a region adjacent to the 3D display region in the vertical direction; a region adjacent to the 3D display region in the horizontal direction; and the remaining region.

First, voltage V1H is applied to the first electrodes 103 in the region adjacent to the 3D display region in the vertical direction. Therefore, when voltages different from the above-mentioned voltages, for example, V2L and V3L are respectively applied to the second electrodes 104 and third electrodes 106, no lens function appears and 2D display can be implemented in this region.

Then, in the region adjacent to the 3D display region in the horizontal direction, voltage V2H is applied to the second electrodes 104, and voltage V3H is applied to the third electrodes 106. In this state, no lens function appears and 2D display can be implemented in this region by applying a voltage different from the aforementioned voltage, for example, V1L to the first electrodes 103.

In the remaining region, voltage V1L is applied to the first electrodes 103, voltage V2L is applied to the second electrodes 104, and voltage V3L is applied to the third electrodes 106, as described above. Accordingly, no lens function appears and 2D display can be implemented in this region as well.

The rest of the arrangement, operation, and effect of this embodiment are the same as those of the above-described first embodiment.

Ninth Embodiment

Figure 30:
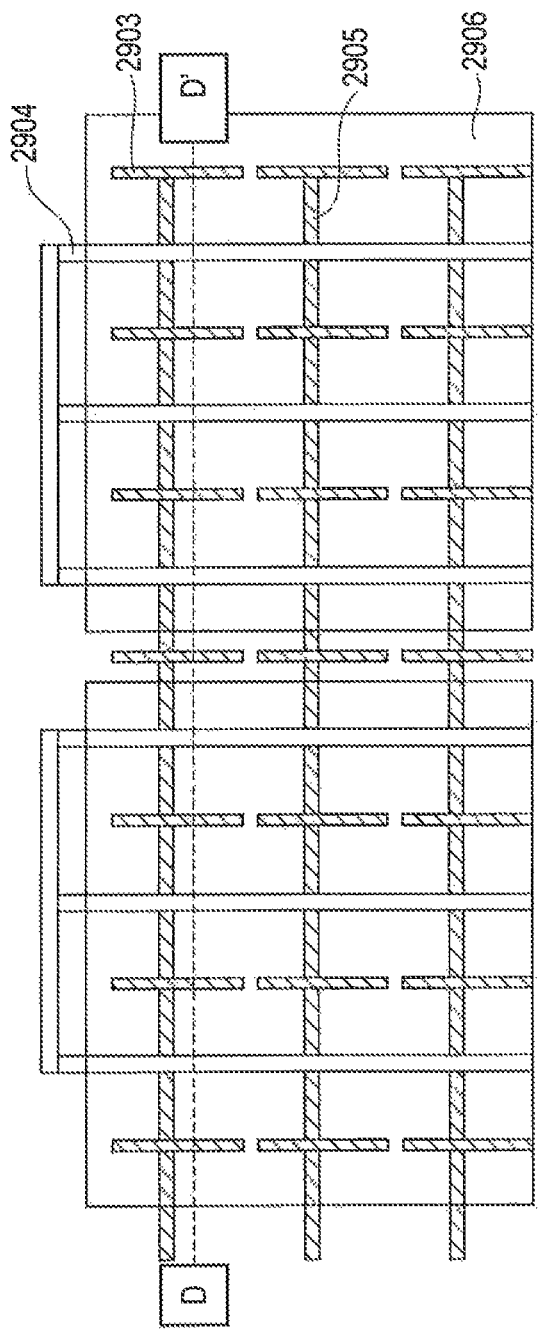
FIG. 30 is a plan perspective view showing the stereoscopic image display device of the ninth embodiment.
Figure 31:
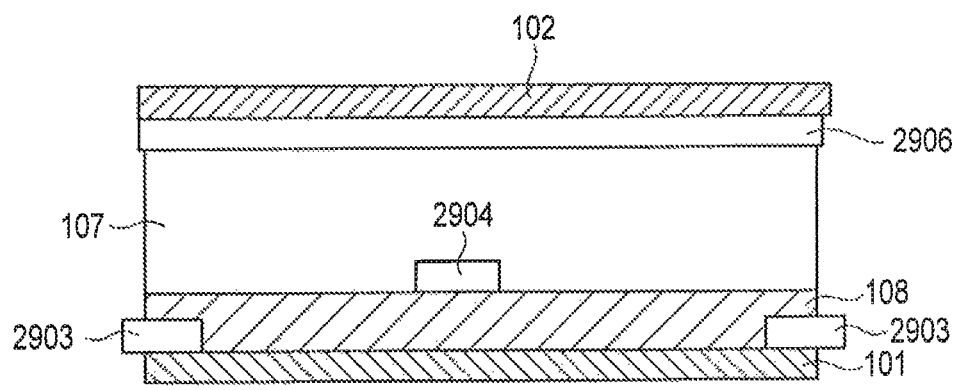
FIG. 31 is a sectional view taken along line D-D' in FIG. 30.
Figure 32:
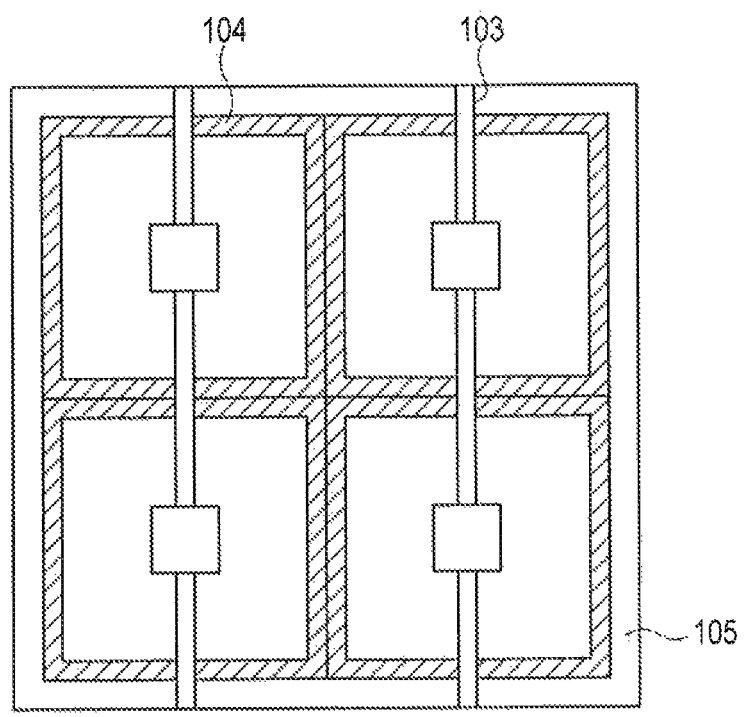
FIG. 32 is a plan perspective view showing a liquid crystal lens array element of the tenth embodiment.

Instead of the liquid crystal lens array element and stereoscopic image display device shown in FIGS. 1 and 2, an element and device will be explained below with reference to FIGS. 29, 30, and 31. As in FIG. 1; a portion indicated by the thick black dotted lines in FIG. 29 indicates one lens unit. FIG. 31 is a sectional view showing the portion indicated by the thick black dotted lines in FIG. 29 in a direction perpendicular to a substrate. FIG. 32 is a plan perspective view of FIG. 29.

The third electrodes extend in the second direction in the above-described first embodiment, but the third electrodes extend in the first direction in this embodiment.

The stereoscopic image display device of the modification includes a first substrate 101, a second substrate 102, first electrodes 2904, second electrodes 2903, second extraction electrodes 2905, third electrodes 2906, a liquid crystal 107, a dielectric material 108, a polarizing plate 109, a two-dimensional image display device 110, a first column voltage supply unit 2911, a second column voltage supply unit 2912, a first address voltage supply unit 2914, a second address voltage supply unit 2915, and a third address voltage supply unit 2916. The liquid crystal lens array element corresponds to a portion obtained by excluding the polarizing plate 109 and two-dimensional image display device 110 from the stereoscopic image display device, and includes the first substrate 101, second substrate 102, first electrodes 2904, second electrodes 2903, second extraction electrodes 2905, third electrodes 2906, liquid crystal 107, dielectric material 108, first column voltage supply unit 2911, second column voltage supply unit 2912, first address voltage supply unit 2914, second address voltage supply unit 2915, and third address voltage supply unit 2916.

The second electrodes 2903 are made of a conductor and extend by a given length in the first direction on the first substrate 101. The second electrodes 2903 are divided into a third number of groups, and each group includes a plurality of second electrodes 2903. The end portions of the plurality of second electrodes 2903 in each group are electrically connected by the second extraction electrode in a second direction different from the first direction. The second electrodes 2903 connected by one extraction line belong to the same group. Referring to FIG. 29, three groups are arranged parallel in the first direction.

The dielectric material 108 is stacked on the first substrate 101 and second electrodes 2903. The first electrodes 2904 are arranged to extend in the first direction on the dielectric material 108. The first electrodes 2904 are divided into a fourth number of groups, and each group includes a plurality of first electrodes 2904. The end portions of the plurality of first electrodes 2904 in each group are electrically connected. By contrast, different groups are not electrically connected.

The extending direction of the first electrodes 2904 and that of the second electrodes 2903 are the same. In the horizontal direction of the substrate, one second electrode 2903 is formed in a position (for example, a central position) between two adjacent first electrodes 2904. In the example shown in FIG. 29, six first electrodes 2904 are arranged between seven second electrodes 2903. Two adjacent first electrodes 2904, one second electrode 2903 positioned between the two first electrodes 2904, and one third electrode 2906 positioned above the second electrode 2903 form a set, and a region where a region defined by the two first electrodes 2904 overlaps one third electrode 2906 is a unit region of partial display.

The liquid crystal 107 is a liquid crystal showing uniaxial birefringence, and filled between the second substrate 102 and the stack of the dielectric material 108, second electrodes 2903, and second extraction electrodes 2905. The third electrodes 2906 are stacked on the surface of the second substrate 102 on which the liquid crystal 107 exists.

The third electrodes 2906 are made of a conductor, and extend by a given length in the first and second directions on the second substrate 102. Each third electrode 2906 extends on the second substrate 102 so as to exist above all electrodes included in one group of the first electrodes 2904. The number of third electrodes 2906 is the fourth number as the number of groups of the first electrodes 2904.

The first column voltage supply unit 2911 is electrically connected to the first electrodes 2904 of the first group, and the third electrode 2906 positioned above this group. The second column voltage supply unit 2912 is electrically connected to the first electrodes 2904 of the second group, and the third electrode 2906 positioned above this group. The jth column voltage supply unit (j=1, 2) is electrically connected to the first electrodes 2904 of the jth group and the electrode positioned above this group, and sets the connection destinations at the same predetermined potential.

The first address voltage supply unit 2914 is electrically connected to the second extraction electrode 2905 of the first group, the second address voltage supply unit 2915 is electrically connected to the second extraction electrode 2905 of the second group, and the third address voltage supply unit 2916 is electrically connected to the second extraction electrode 2905 of the third group. The first and second address voltage supply units 2914 and 2915 set the respective connection destinations at the same predetermined potential.

The polarizing plate 109 is set below the first substrate 101, and the two-dimensional image display device 110 is set below the polarizing plate 109.

Note that in the example shown in FIG. 29, the third number as the number of groups of the second electrodes 2903 is 3, and the second number as the number of groups of the first electrodes 2904 is 2. However, these numbers are merely examples and can properly be changed in accordance with the size of the display screen, the size of the partial display region, or the like. Note also that "a high voltage" and "a low voltage" herein mentioned mean nothing but relative voltage values. That is, this merely indicates that "a high voltage" has a voltage value higher than that of "a low voltage".

Although details will not be explained, the liquid crystal lens array element and stereoscopic image display device of this embodiment achieve the same effects as those of the liquid crystal lens array element and stereoscopic image display device shown in FIG. 1 described earlier by the same operations as those of this element and device.

Also, this embodiment is more suitably-applicable when the second electrode 2903 is narrower than the first electrode 2904, and can improve the yield of manufacture. This is so because it is sometimes possible to achieve a higher yield when electrodes are processed on the first substrate 101, than when they are processed on the dielectric material 108. For example, when the dielectric material 108 is formed by an organic material, the electrodes can be processed more easily on a glass substrate as an inorganic material, than on the organic material. When forming finer electrodes, therefore, it is more favorable to process the electrodes on the first substrate 101. That is, the second electrodes 2903 are more preferably finer electrodes.

In the liquid crystal lens array element and stereoscopic image display device of the above embodiment, the second electrodes as power supply electrodes or the first and third electrodes as ground electrodes are divided, and the extraction lines are formed in a direction different from the lens. Since the voltage applied to the liquid crystal can be split into the horizontal and vertical directions in the liquid crystal GRIN lens plane. This makes it possible to increase the degrees of freedom of the size and position of partial 3D display.

Tenth Embodiment

A liquid crystal lens array element of this embodiment will be explained below with reference to FIG. 25. FIG. 25 is a plan perspective view showing the liquid crystal lens array element of this embodiment in a direction perpendicular to a substrate.

The difference of the liquid crystal lens array element of this embodiment from the liquid crystal lens array element described in the above-mentioned first embodiment is the shape of first electrodes 103 when viewed from the upper surface. In the above-described first embodiment, the first electrodes 103 extend along the first direction. In this embodiment, however, first extraction electrodes extend along the first direction, and first electrodes electrically connected to the first extraction electrodes are formed. In addition, second electrodes are formed to surround the first electrodes.

That is, the first electrodes 103 and second electrodes 104 extend along the first direction in the above-mentioned first embodiment, but the present embodiment is not limited to this. Various optimum structures can be formed for the first and second electrodes for forming a lens. The point of each embodiment is that extraction electrodes for connecting at least two types of electrodes provided on the first substrate side extend in different directions, and the extending direction of extraction electrodes provided on the second substrate matches one of the above-described directions.

This embodiment is suitably applicable when implementing a two-dimensional lens array.

The rest of the arrangement, operation, and effect of this embodiment are the same as those of the above-described first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gradient index liquid crystal optical device comprising:
   a first substrate unit including:
      a first substrate;
      a plurality of first electrodes provided on the first substrate to extend in a first direction;
      a plurality of electrode sets arranged in the first direction, each of the electrode sets being not electrically connected to each other, each of the electrode sets including:
         a plurality of second electrodes provided on the first substrate and extending along the first direction, each of the second electrodes being arranged between the first electrodes when each of the second electrodes is projected onto a plane parallel to the first substrate, each of the second electrodes being arranged along a second direction intersecting the first direction; and
         an extraction electrode for electrically connecting the second electrodes, the extraction electrode being provided on the first substrate to extend in a third direction intersecting the first direction, wherein a portion of the extraction electrode which is formed between the second electrodes electrically connects the second electrodes; and
      a layer which insulates the first electrodes from the second electrodes,
   a second substrate unit including:
      a second substrate; and
      a third electrode provided on the second substrate to extend in the second direction, and
   a liquid crystal layer provided between the first substrate and the second substrate,
   wherein one of the first electrodes intersects with at least two of the extraction electrodes.

2. The device according to claim 1, wherein the first electrodes are electrically connected to form a group.

3. The device according to claim 2, further comprising:
   a first voltage supply unit configured to supply a same first voltage to the extraction electrode, and the third electrode opposing the extraction electrode; and a second voltage supply unit connected to the group of the first electrodes and configured to supply a second voltage.

4. The device according to claim 1, wherein the extraction electrode is formed between the first substrate and the second substrate.

5. The device according to claim 4, wherein the first electrodes and the second electrodes are formed between the first substrate and the liquid crystal.

6. The device according to claim 1, wherein the first electrodes and the second electrodes are alternately repetitively arranged along the third direction.

7. The device according to claim 1, wherein the first electrodes comprise a portion extending along the first direction, and a bent portion.

8. The device according to claim 1, wherein the extraction electrode comprises a portion inclining with respect to the third direction.

9. The device according to claim 1, wherein the extraction electrode is electrically connected to the third electrode formed to oppose the second electrodes connected to the extraction electrode.

10. The device according to claim 1, wherein the third electrode is formed to oppose the extraction electrode.

11. The device according to claim 1, wherein when no voltage is applied to the liquid crystal layer, a long-axis direction of liquid crystal molecules is oriented in a direction perpendicular to the first direction.

* * * * *